United States Patent
Tischer

(10) Patent No.: US 8,935,011 B2
(45) Date of Patent: Jan. 13, 2015

(54) ELECTRICAL LOAD MANAGEMENT SYSTEM AND METHOD

(75) Inventor: William D. Tischer, St. Paul, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 13/174,637

(22) Filed: Jun. 30, 2011

(65) Prior Publication Data

US 2012/0173033 A1 Jul. 5, 2012

Related U.S. Application Data

(60) Provisional application No. 61/360,277, filed on Jun. 30, 2010, provisional application No. 61/383,224, filed on Sep. 15, 2010.

(51) Int. Cl.
G05D 29/00 (2006.01)
H02J 3/14 (2006.01)
H02J 7/00 (2006.01)

(52) U.S. Cl.
CPC ............... *H02J 3/14* (2013.01); *H02J 7/0022* (2013.01); *H02J 7/0027* (2013.01); *Y02B 70/3225* (2013.01); *Y04S 20/222* (2013.01)
USPC ........... 700/295; 700/293; 700/286; 700/292; 700/297

(58) Field of Classification Search
None
See application file for complete search history.

(56) References Cited

U.S. PATENT DOCUMENTS

| | | | | |
|---|---|---|---|---|
| 4,106,013 A | * | 8/1978 | Cronin | 340/971 |
| 4,153,936 A | * | 5/1979 | Schmitz et al. | 700/296 |
| 4,177,388 A | * | 12/1979 | Lingenfelter | 307/38 |
| 4,324,987 A | * | 4/1982 | Sullivan et al. | 307/35 |
| 4,336,462 A | * | 6/1982 | Hedges et al. | 307/35 |
| 4,471,232 A | * | 9/1984 | Peddie et al. | 307/35 |
| 4,549,274 A | * | 10/1985 | Lerner et al. | 700/295 |
| 4,918,368 A | | 4/1990 | Baker et al. | |
| 4,961,151 A | | 10/1990 | Early et al. | |
| 5,191,520 A | * | 3/1993 | Eckersley | 363/72 |
| 5,483,656 A | * | 1/1996 | Oprescu et al. | 713/320 |

(Continued)

FOREIGN PATENT DOCUMENTS

| EP | 0470065 A1 | 2/1992 |
|---|---|---|
| EP | 2589277 A1 | 5/2013 |

(Continued)

OTHER PUBLICATIONS

International Search Report and Written Opinion for PCT/US2011/042714, Nov. 22, 2011, 18 pages.

(Continued)

*Primary Examiner* — Kavita Padmanabhan
*Assistant Examiner* — Christopher E Everett
(74) *Attorney, Agent, or Firm* — Schwegman Lundberg & Woessner, P.A.

(57) ABSTRACT

A load management system provides an interface between a power input and several switched power outputs and un-switched power outputs. A controller groups the switched power outputs into one or more load groups based on a switched current limit determined for the system and the measured currents of the electrical loads. The load groups are defined so that the sum of electrical load currents in each load group does not exceed the switched current limit. The controller also activates one or more switches to apply electrical power to the load groups according to a power sequence. A method for distributing electrical power to electrical loads using load groups is also provided.

35 Claims, 18 Drawing Sheets

(56) References Cited

U.S. PATENT DOCUMENTS

| | | | |
|---|---|---|---|
| 5,563,496 A | 10/1996 | McClure | |
| 5,583,419 A * | 12/1996 | Haller | 322/8 |
| 5,604,385 A * | 2/1997 | David | 307/52 |
| 5,637,933 A * | 6/1997 | Rawlings et al. | 307/147 |
| 5,652,498 A | 7/1997 | Edye et al. | |
| 5,752,046 A * | 5/1998 | Oprescu et al. | 713/300 |
| 5,754,445 A * | 5/1998 | Jouper et al. | 700/295 |
| 5,842,027 A * | 11/1998 | Oprescu et al. | 713/300 |
| 5,994,876 A | 11/1999 | Canny et al. | |
| 6,008,621 A | 12/1999 | Madison et al. | |
| 6,018,690 A * | 1/2000 | Saito et al. | 700/295 |
| 6,046,513 A * | 4/2000 | Jouper et al. | 307/31 |
| 6,064,179 A | 5/2000 | Ito et al. | |
| 6,181,103 B1 | 1/2001 | Chen | |
| 6,218,796 B1 | 4/2001 | Kozlowski | |
| 6,233,693 B1 * | 5/2001 | Berglund et al. | 713/340 |
| 6,301,674 B1 * | 10/2001 | Saito et al. | 713/340 |
| 6,510,369 B1 * | 1/2003 | Lacy | 700/295 |
| 6,624,532 B1 * | 9/2003 | Davidow et al. | 307/39 |
| 6,714,891 B2 | 3/2004 | Dendinger | |
| 6,741,442 B1 | 5/2004 | McNally et al. | |
| 6,768,225 B2 | 7/2004 | Chang et al. | |
| 6,771,044 B1 | 8/2004 | Vinciguerra et al. | |
| 6,888,338 B1 | 5/2005 | Popescu-Stanesti et al. | |
| 6,925,363 B2 * | 8/2005 | Hutton | 700/295 |
| 7,055,833 B2 | 6/2006 | Wixted et al. | |
| 7,130,190 B1 | 10/2006 | Baker | |
| 7,141,891 B2 | 11/2006 | McNally et al. | |
| 7,160,113 B2 | 1/2007 | McConnell | |
| 7,161,329 B2 * | 1/2007 | McLoughlin et al. | 322/45 |
| 7,173,821 B2 | 2/2007 | Coglitore | |
| 7,222,246 B2 * | 5/2007 | Pomaranski et al. | 713/300 |
| 7,256,516 B2 * | 8/2007 | Buchanan et al. | 307/62 |
| 7,324,006 B2 | 1/2008 | Godard | |
| 7,373,222 B1 * | 5/2008 | Wright et al. | 700/295 |
| 7,414,381 B2 | 8/2008 | Popescu-Stanesti et al. | |
| 7,457,106 B2 | 11/2008 | Ewing et al. | |
| 7,535,696 B2 | 5/2009 | Ewing et al. | |
| 7,580,775 B2 * | 8/2009 | Kulyk et al. | 700/296 |
| 7,595,995 B2 | 9/2009 | Hock | |
| 7,800,914 B2 | 9/2010 | Dully | |
| 7,948,113 B2 | 5/2011 | Abe | |
| 7,964,994 B2 | 6/2011 | Dubose et al. | |
| 7,982,335 B2 | 7/2011 | Aldag et al. | |
| 7,991,513 B2 * | 8/2011 | Pitt | 700/295 |
| 8,054,598 B1 * | 11/2011 | Sadler et al. | 361/63 |
| 8,125,194 B2 | 2/2012 | Nethken | |
| 8,178,997 B2 * | 5/2012 | Talkin et al. | 307/41 |
| 8,207,627 B2 | 6/2012 | Aldag et al. | |
| 8,305,737 B2 | 11/2012 | Ewing et al. | |
| 8,427,815 B2 | 4/2013 | Fontana et al. | |
| 2002/0117902 A1 | 8/2002 | Evers et al. | |
| 2003/0048007 A1 | 3/2003 | Mercier et al. | |
| 2004/0027843 A1 | 2/2004 | Mahlein et al. | |
| 2004/0148060 A1 | 7/2004 | Lee | |
| 2005/0094336 A1 | 5/2005 | Cleveland et al. | |
| 2005/0107892 A1 * | 5/2005 | Matsui et al. | 700/28 |
| 2007/0058344 A1 | 3/2007 | Baker | |
| 2008/0278119 A1 | 11/2008 | Veselic | |
| 2009/0018706 A1 * | 1/2009 | Wittner | 700/295 |
| 2009/0026838 A1 | 1/2009 | Abe | |
| 2009/0045775 A1 | 2/2009 | Popescu Stanesti et al. | |
| 2009/0152942 A1 | 6/2009 | Waite et al. | |
| 2009/0230919 A1 | 9/2009 | Nethken | |
| 2010/0145535 A1 * | 6/2010 | Tyler et al. | 700/292 |
| 2011/0172846 A1 * | 7/2011 | Kulyk et al. | 700/296 |
| 2011/0184579 A1 * | 7/2011 | Nilsen et al. | 700/295 |
| 2011/0218690 A1 * | 9/2011 | O'Callaghan et al. | 700/295 |
| 2012/0120306 A1 * | 5/2012 | Schindler et al. | 348/372 |

FOREIGN PATENT DOCUMENTS

| | | |
|---|---|---|
| FR | 2683685 A1 | 5/1993 |
| GB | 2159671 A | 12/1985 |
| JP | 06-284573 A | 10/1994 |
| JP | 2010-511363 A | 4/2010 |
| JP | 2013532465 A | 8/2013 |
| WO | WO-2004/059757 A2 | 7/2004 |
| WO | WO2009082595 A2 | 7/2009 |

OTHER PUBLICATIONS

Owners Manual, "Notebook Charging Carts 10-Unit and 20-Unit," Anthro Technology Furniture, Mar. 2011, 4 pages.

"Education," Anthro Technology Furniture, Feb. 2011, 16 pages.

Owners Manual, "Laptop Storage Cart," Anthro Technology Furniture, May 2007, 4 pages.

"Australian Application Serial No. 2011272799, Amendment filed Jul. 23, 2013", 85 pgs.

"Australian Application Serial No. 2011272799, First Examiner Report mailed Feb. 17, 2014", 3 pgs.

"European Application Serial No. 11801462.0, Response filed Sep. 20, 2013 to Office Action mailed Mar. 12, 2013", 14 pgs.

"European Application Serial No. 11801462.0, Office Action mailed Mar. 12, 2013", 2 pgs.

"International Application Serial No. PCT/US2011/042714, International Preliminary Report on Patentability mailed Jan. 17, 2013", 14 pgs.

"Japanese Application Serial No. 2013-518744, Office Action mailed Jul. 22, 2014", (w/ English Translation), 5 pgs.

"Bretford Intelligent Laptop Computer Cart Power Management System (The Brain)", (Nov. 4, 2009), 2 pgs.

"Give Impressionable Minds an Inspired Brain", © 2009 Brettford Manufacturing, Inc., LAPBROCHJUNE2009, (2009), 4 pgs.

"Machine Translation of FR 2683685A1, published May 14, 1993", 15 pgs.

"Machine Translation of EP 0470065A1, published Feb. 5, 1992", 13 pgs.

"The Most Intelligent Way to Store and Recharge Laptop Computers", (Nov. 10, 2003), 1 pg.

* cited by examiner

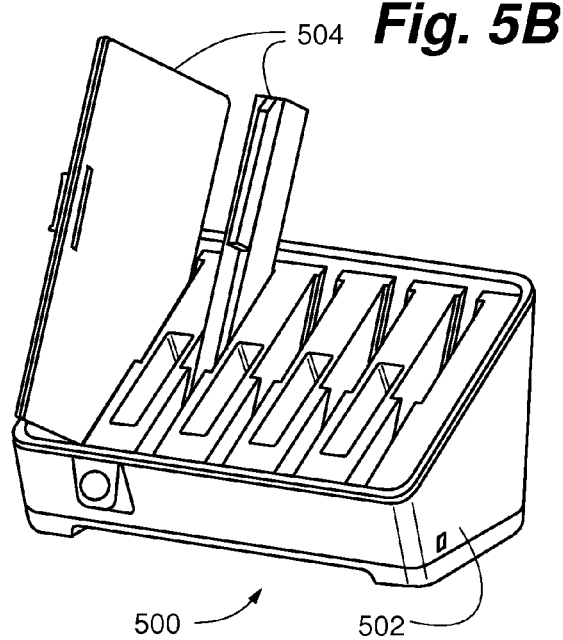
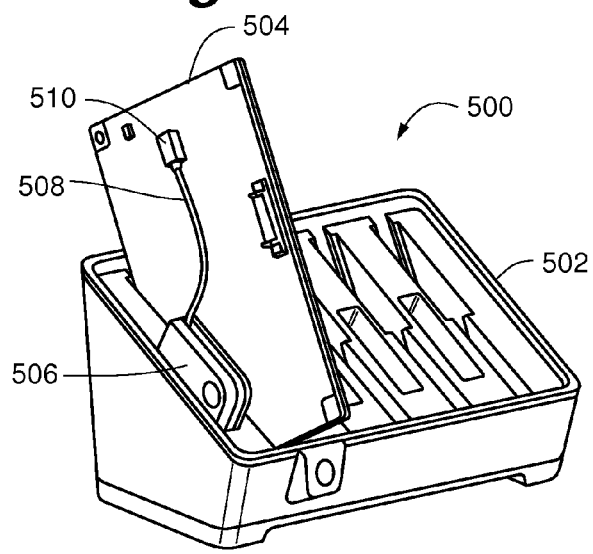
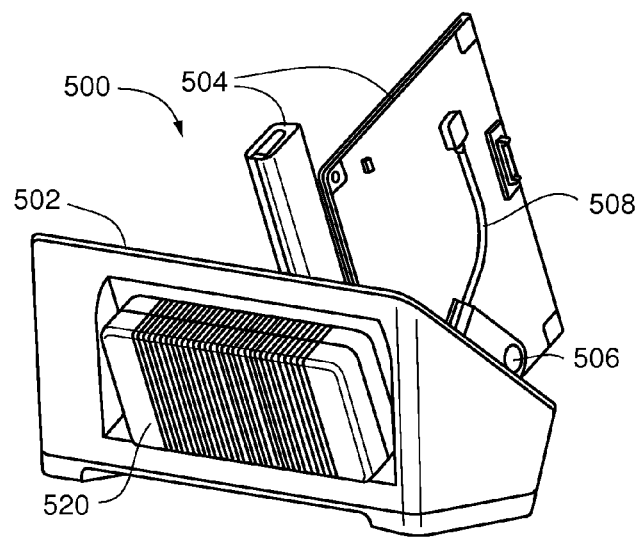

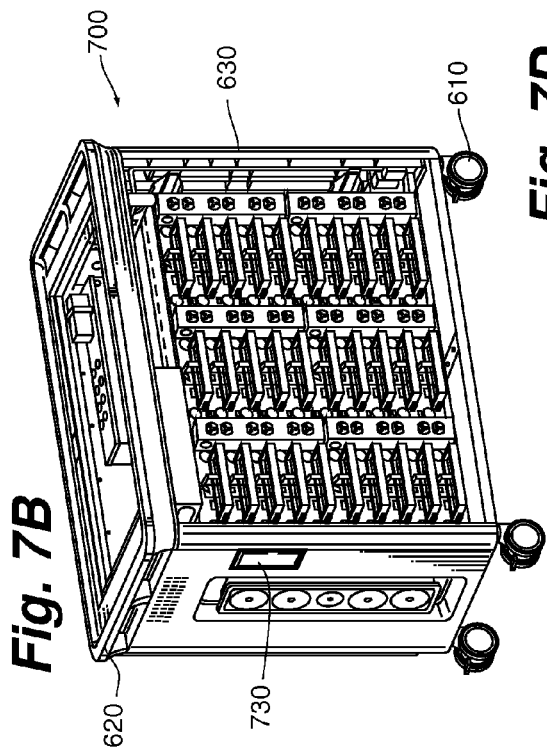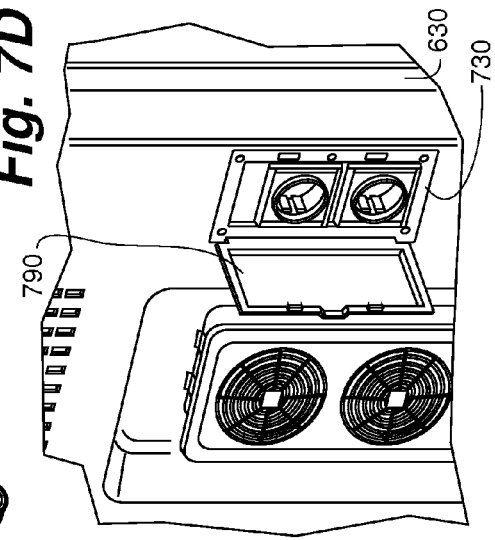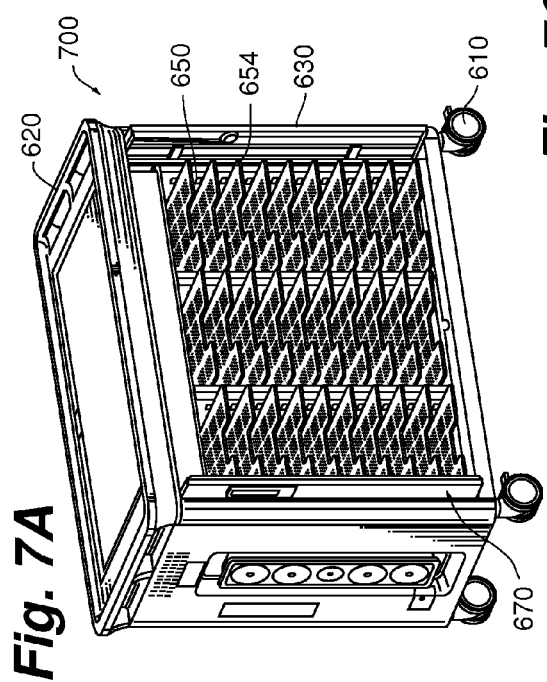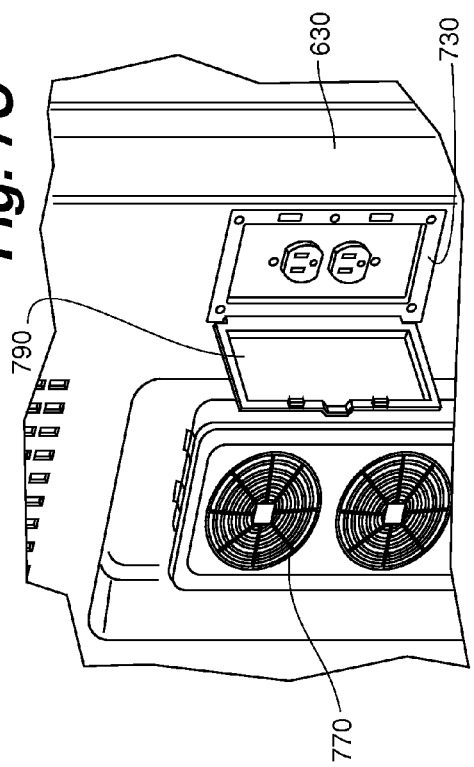

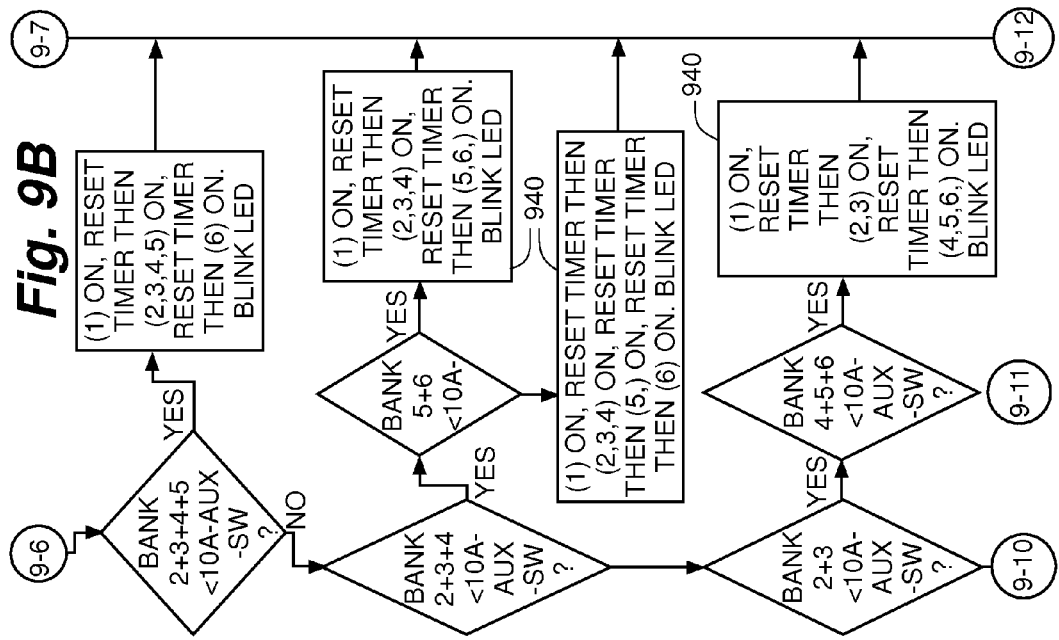
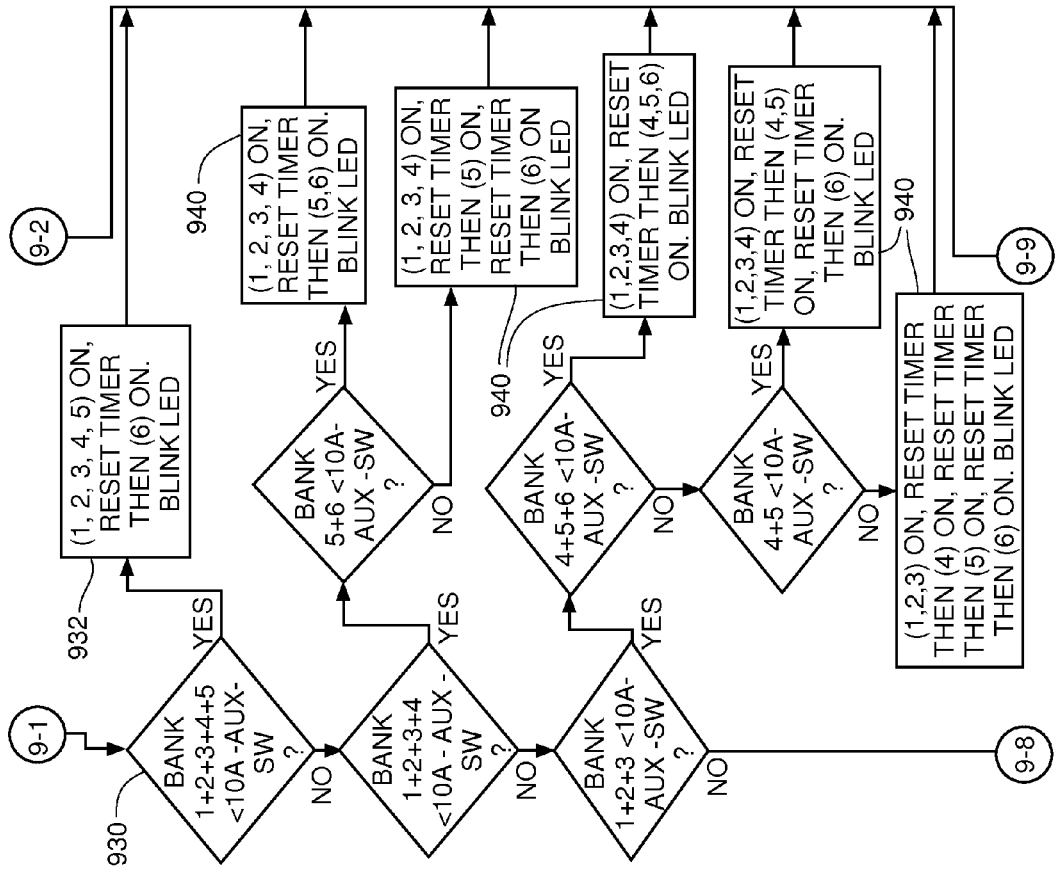
Fig. 9B

ELECTRICAL LOAD MANAGEMENT SYSTEM AND METHOD

CROSS-REFERENCES

This application claims the benefit of U.S. Provisional Application No. 61/360,277, filed Jun. 30, 2010, and U.S. Provisional Application No. 61/383,224, filed Sep. 15, 2010, the contents both of which are hereby incorporated by reference in their entirety.

FIELD

Embodiments of the invention generally relate the management of electrical loads and more particularly relate to load management of electrical devices requesting more power than is available from a common power source.

BACKGROUND

There are many instances in which multiple electrical loads are connected to and powered by a single, common electrical power source. The common power source may be designed to provide sufficient power for all of the electrical loads, to ensure that each load is adequately powered.

In certain circumstances, though, it may be desirable to provide power to a number of electrical loads from a power source that does not supply enough power to adequately power all of the electrical loads. Requesting more than the available power may in some cases lead to inadequate device performance as well as, or in addition to, activation of protection circuitry built into the power source. For example, an overload can result due to a circuit breaker tripping, an overcurrent or current limiting circuit causing a power source voltage fold-back, or other method of limiting the distributed power to a known acceptable level without exceeding the source power available. Activation of the protection features can lead to reduced or no power reaching the electrical load(s) that needs powering. Consequently, the functionality of the load(s) attached to the power source can be reduced or disabled.

Source power might be limited for a number of reasons, including, for example, the size of wiring, circuit breaker limits, National and International Electrical Codes, development of harmonic currents, vehicle electrical power limits, or limits stemming from currently available alternative energy sources such as solar or wind-generated power.

One example of an arrangement that may be subject to these types of limitations is a computer notebook or laptop charging cart or charging station. There are many situations in which multiple laptop computers are simultaneously used. For example, multiple laptop computers are widely used in classrooms for educational purposes. In many cases, 10-40 notebooks are simultaneously used in the classroom. Typical laptop carts are cabinets with shelves for the laptops to rest on and power and/or communication connections for charging and/or using the laptops.

In many cases the power consumption required to simultaneously charge and/or use many notebooks can exceed the limits set forth by the National Electrical Code and foreign equivalents for alternating current (AC) line voltages. This type of power consumption may also often exceed the capacity of a direct current (DC) power source that provides the bulk charge current for the electronics that charge notebook batteries directly. Known charging methods require a user to manually switch power between groups of notebooks or batteries to keep the peak current draw within the limitations of the physical configuration. If computer carts or charging stations are provided with auxiliary power take-offs, known methods also require the user to manually switch on any external devices to be powered while internal devices are switched off.

SUMMARY

According to an aspect of the invention an electrical load management system is provided for switching electrical power among a number of electrical loads. The load management system include an electrical power input that couples the load management system with a common power source and a plurality of electrical power outputs that couple with multiple electrical loads. A number of switches couple the power input to the power outputs. A current sensor is coupled to the power outputs and senses a current drawn by one or more of the power outputs. A controller is coupled to the switches and the current sensor, and is configured to measure a current drawn by each of the power outputs and respective electrical loads. The controller also groups the power outputs and electrical loads into one or more load groups based on a switched current limit determined for the system and the measured currents of the electrical loads. The load groups are defined so that the sum of electrical load currents in each load group does not exceed the switched current limit. The controller is also configured to activate the switches to apply electrical power from the common power source to the load groups according to a power sequence.

Another aspect of the invention provides a method for distributing electrical power to electrical loads. The method includes measuring a current drawn by each of a number of electrical loads coupled to a common power source through a load management system. The electrical loads are grouped into one or more load groups based on a switched current limit and the measured currents of the electrical loads. The grouping is configured so that, for each load group, a sum of the measured currents of the electrical loads in the load group does not exceed the switched current limit. The method also includes applying electrical power from the common power source to the load groups by switching the electrical power to each of the load groups according to a power sequence.

Another aspect of the invention provides for managing the electrical load of a charging station. The charging station includes an electrical power input configured to couple the charging station with a common power source and multiple switched electrical power outputs configured to couple the charging station with a number of electrical loads for charging. The charging station also includes a number of switches coupled between the power input and the switched power outputs for applying electrical power from the common power source to the switched power outputs. A current sensor is coupled to the switched power outputs for sensing a current drawn by one or more of the switched power outputs. In one embodiment, an optional un-switched power output is coupled to the electrical power input and configured to couple the charging station with an un-switched electrical load, while a second current sensor coupled to the un-switched output senses a current drawn by the un-switched power output. In both embodiments, the charging system includes a controller coupled to the switches, the first current sensor, and optionally the second current sensor. The controller measures with the first current sensor a current drawn by each of the electrical loads respectively coupled to the switched power outputs. After measuring the currents, the controller groups the switched power outputs and respective electrical loads into one or more load groups based on a switched current limit and the measured currents of the electrical loads such that, for each load group, a sum of the measured currents of the electrical loads in the load group does not exceed the switched current limit. The controller is also configured to activate the switches to apply electrical power from the common power source to the load groups according to a power sequence. In some cases the controller is configured to determine a switched current limit based on the current drawn by the optional un-switched power output and/or a current limit of the common power source.

These and various other features and advantages will be apparent from a reading of the following detailed description.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

FIG. 5B is a perspective view of a charging station in accordance with an embodiment of the invention.

FIG. 5C is another perspective view of the charging station of FIG. 5B.

FIG. 5D is a rear perspective view of the charging station of FIG. 5B.

FIG. 7A is a front perspective view of a cart with its doors opened in accordance with an embodiment of the invention.

FIG. 7B is a rear perspective view of the cart of FIG. 7A with its rear panel removed.

FIG. 7C is a front perspective view of an auxiliary power outlet having a cover in the open position in accordance with an embodiment of the invention.

FIG. 7D is a front perspective view of an auxiliary power outlet having a cover in the open position in accordance with an embodiment of the invention.

FIGS. 9A-9C are a flow diagram illustrating a method of charging multiple notebook computers in accordance with an embodiment of the invention.

DETAILED DESCRIPTION OF THE PREFERRED EMBODIMENTS

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
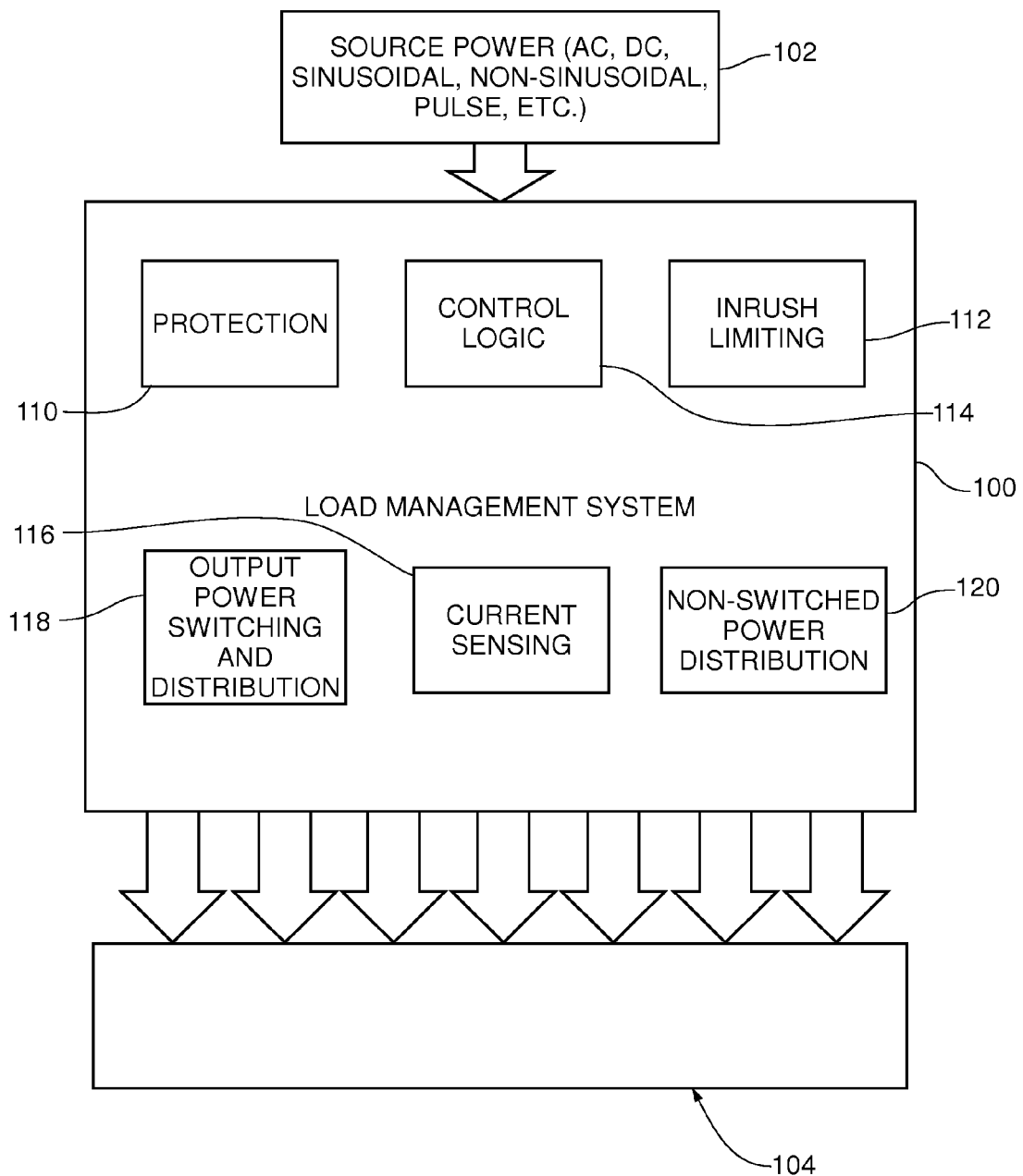
FIG. 1 is a high-level diagram illustrating multiple functions of a load management system in accordance with an embodiment of the invention.

FIG. 1 is a high-level diagram illustrating a load management system 100 according to an embodiment of the invention. In general, the system 100 provides an interface between a power source 102 and multiple electrical loads 104, controlling distribution of electrical power from the power source 102 to one or more of the electrical loads 104. The load management system 100 can provide a useful solution for managing electrical loads in a variety of contexts. For example, the system 100 can be used for powering and/or charging large numbers of laptop computers (also referred to herein as "notebook computers" or "notebooks") used in a school classroom or in a business setting. The system 100 could also be used to manage electrical power for a group of mobile computing devices, including for example, a tablet computer, a cell phone, a smart phone, a personal digital assistant, a camera, a music player, and/or a global positioning satellite (GPS) device. In some instances the system 100 may be useful for providing electrical power to a number of electrical loads coupled to a vehicle (e.g., automobile, aircraft, etc.) power system. Of course, these are just a few contemplated examples for using the system 100, and the system 100 may also be useful in other situations.

In some cases the load management system 100 could be useful for managing delivery of electrical power from an alternative energy source such as wind or solar power to multiple electrical loads. Other energy sources may be coupled to the system 100, and the particular format or configuration of the electrical power may vary depending upon the requirements of a particular embodiment. As will be discussed further herein, in some cases the power source 102 may provide AC power or DC power. In some embodiments the electrical power is pulsed, sinusoidal, non-sinusoidal, or has another waveform.

As shown in FIG. 1, the load management system 100 provides a number of functions that may be useful for distributing power to the multiple electrical loads 104. In particular, the system 100 provides power source protection 110, inrush current limiting 112, control logic 114, current sensing 116, switched power distribution 118, and non-switched power distribution 120. According to some embodiments, the functionality of the load management system 100 can be implemented and provided by hardware and firmware or software, or a combination of hardware, firmware, and software. The illustrated system 100 is just one example of a load management system described herein, and other embodiments may provide all or only some of the functions shown in FIG. 1, or may provide different functions not depicted. Several of the functions for the illustrated load management system 100 will be described in more detail hereinafter.

Figure 2:
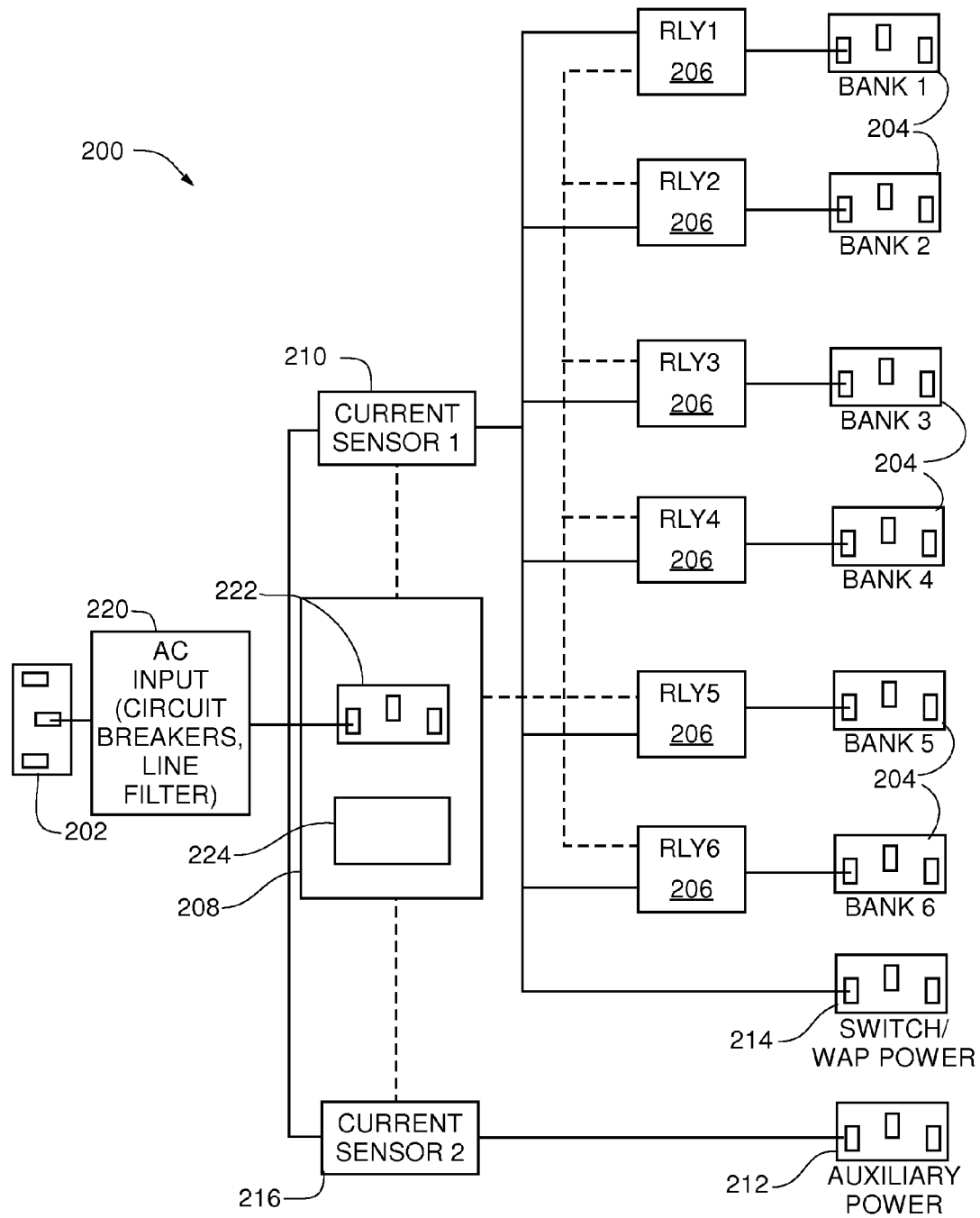
FIG. 2 is a high-level schematic of a load management system in accordance with an embodiment of the invention.

FIG. 2 is a high-level schematic of a load management system 200 in accordance with an embodiment of the invention. The system 200 generally provides an interface between an electrical power input 202 and multiple electrical power outputs 204. The power outputs 204 are coupled to the input through switches 206, which serve to selectively transmit electrical power to the power outputs 204. Control of the switches 206 and thus distribution of power from the power input 202 to one or more of the power outputs 204 is controlled and managed by a controller 208. A current sensor 210 is coupled to the electrical power outputs 204 and the controller 208, thus allowing the controller 208 to make decisions about power distribution based on measured currents drawn by one or more of the power outputs 204. In this embodiment the load management system 200 also includes two un-switched power outputs, including an un-switched auxiliary power output 212 and an un-switched networking power output 214. The networking power output 214 is coupled to the first current sensor 210, which also provides measurements of current drawn by the networking power output 214. A second current sensor 216 is coupled to the un-switched auxiliary output 212 and provides measurements of current drawn by the auxiliary output 212.

Referring again to FIG. 2, the electrical power input 202 is configured to couple the load management system with a single, common power source (not shown). In this embodiment, the power input 202 is a power outlet and site power is brought into the system 200 through a power cord and connected plug. Other types of electrical power inputs may also be used, including other removable connectors, as well as hard-wired connections. In some embodiments, the electrical power is then distributed to the system 200 through a protection and conditioning circuit 220. The protection and conditioning circuit 220 includes circuit breakers and/or resettable fuses (e.g., PTC devices) and a line filter to control emissions from the rest of the load management system 200 and electrical loads attached to the power outputs 204. The load management system 200 is configured in this example to receive AC power at the power input 202. Other embodiments may be configured to receive DC power.

The load management system 200 receives the electrical power through the power input 202, and then routes it to one or more of the power outputs 204 through switches 206. The power outputs 204 are configured to couple the load management system with one or more electrical loads (not shown in FIG. 2). In the example shown in FIG. 2, the power outputs 204 are configured as power outlets that can receive a plug connected to an electrical load. Other types of connections may be used depending upon the situation, including outputs hard-wired to the electrical loads.

The switches 206 are coupled between the power input 202 and the power outputs 204. Accordingly, the power outputs 204 are also referenced as "switched" power outputs. The switches 206 can be implemented using any suitable switching device known in the art. Examples include, but are not limited to, solid-state relays (AC and DC), triacs (AC), and MOSFETS (DC). The switches 206 are coupled to the controller 208, which operates the switches through, e.g., low-level control logic signals.

The controller 208 receives operating power from the power input 202 via an input 222. In the case that the electrical power is AC, the controller 208 may also include an AC/DC converter for generating a DC signal to power the controller 208. The controller 208 includes a processing component 224 configured to provide the desired control for the system 200. The processing component can be implemented in any suitable combination of hardware, firmware, and/or software. In some cases the processing component includes a microcontroller and associated firmware stored in integrated memory. In one example the processing component 224 is implemented with a programmable integrated circuit (PIC) or a programmable logic device (PLD), though other types of programmable processors are also contemplated.

As shown in FIG. 2, the controller 208 is coupled to the current sensor 210, which is in turn coupled to each of the power outputs 204 through the switches 206. The current sensor 210 can be implemented using any suitable approach, including, for example, a resistive shunt, a Hall-effect sensor, or an inductive sensor, among others. Through the sensor 210, the controller 208 can monitor and measure the current drawn by one or more power outputs 204 (e.g., by the electrical load coupled to the output) alone or in various combinations. To measure a current drawn by a particular power output 204, the controller 208 is configured to activate the switch 206 corresponding to the particular power output 204 while deactivating the switches for the other power outputs. The controller 208 then uses the current sensor 210 to monitor the current drawn from the power input 202.

In the example shown in FIG. 2, a single current sensor 210 is used to measure current drawn by each of the electrical power outlets 204. It is also contemplated that multiple current sensors could be used to more quickly (e.g., simultaneously) measure currents drawn by multiple electrical power outputs. For example, a current sensor could be positioned along each of the circuit branches leading to a particular power output 204.

According to some embodiments, the controller 208 is configured to distribute the available electrical power from the power input 202 to the power outputs 204 by grouping the power outputs 204 (and respective loads) and then selectively applying the electrical power to the groups of power outputs according to a power sequence. It has been determined that this can be a useful methodology for powering electrical loads connected to the power outputs 204, especially in cases in which the combined current drawn by the power outputs 204 and respective electrical loads (not shown) may be greater than the current provided by the electrical power input 202. According to this approach, the controller 208 is configured to measure the current drawn by each of the switched power outputs 204 and then group the power outputs 204 and respective electrical loads into one or more load groups based on the measured currents and a determined switched current limit. In one embodiment the switched power outputs 204 are grouped such that a sum of the measured currents of the power outputs 204 in a particular group does not exceed the switched current limit. The controller 208 can then activate the appropriate switches 206 in order to apply the electrical power to the defined groups in sequence.

The switched current limit is a determined threshold that represents a desired limit for the amount of electrical power being applied to the power outputs 204 from the power input 202 at any one time. The switched current limit can be determined using a number of factors, including, for example, the current capacity of the electrical power input 202. As discussed below, in some circumstances the switched current limit can also or alternatively be determined based on an amount of electrical power distributed to outputs other than the switched outputs 204.

According to some embodiments, a load management system can also provide un-switched (e.g., continuous) electrical power to one or more power outputs. As shown in FIG. 2, the load management system 200 includes two un-switched power outputs, namely an un-switched auxiliary power output 212 and an un-switched networking power output 214. The networking power output 214 is coupled to the first current sensor 210, which can provide a measurement of the current drawn by the networking power output 214. A second current sensor 216 is coupled to the un-switched auxiliary output 212 and provides measurements of current drawn by the auxiliary output 212.

Any desirable number of un-switched power outputs can be included in the load management system 200. A current sensor coupled to an un-switched output can be useful to measure the current drawn by the un-switched output. For example, the current sensor 216 in the load management system 200 allows the controller 208 to readily determine the auxiliary port current, which may vary or periodically shut off depending upon the type of load connected to the port 212. In addition, the first current sensor 210 allows the controller 208 to easily determine the current drawn by the networking power output 214 when the switches 206 have been deactivated.

Powering electrical loads through the un-switched power outputs allows the load management system 200 to prioritize electrical power distribution for those loads over the loads connected to the switched power outputs 204. For example, the un-switched power outputs 212, 214 are not subject to the switched power sequence used with the switched outputs 204, and thus the un-switched outputs and connected electrical loads can receive continuous power while the switched outputs 204 may only receive intermittent power in some cases. In addition, in some cases a portion of the available electrical power from the electrical power input 202 is effectively dedicated to the un-switched power outputs, thus decreasing the amount of electrical power available for distribution to the switched power outputs 204. Accordingly, in some cases the switched current limit for the switched outputs 204 is determined based upon the current(s) drawn by the un-switched load(s).

As an example, in one embodiment the controller 208 is configured to sense through the current sensor 216 if an external un-switched load connected to the auxiliary port 212 is powered on. The controller 208 measures the current drawn by the auxiliary port 212 and then subtracts this measured current from the current previously available to the switched power outputs 204. The switched current limit for the switched power outputs can thus be determined or adjusted based on the amount of electrical power being reserved for the un-switched power outputs and loads. In some cases this approach can maximize the current available to the un-switched outputs 212, 214, while still providing a reduced power level to the switched power outputs 204. Once the un-switched load or device is turned off or unplugged from the un-switched output, controller 208 can automatically increase the switched current limit for the switched outputs.

A load management system, such as the system 200 illustrated in FIG. 2, can be modified to be compatible with a wide variety of applications, and may be incorporated into a number of larger systems. As will be discussed with reference to FIGS. 5-12, some embodiments of the invention provide a load management system configured for charging a number of laptop computer batteries, while also providing electrical power for external or peripheral devices. For example, the load management system may provide electrical power to multiple notebooks or notebook batteries through multiple switched power ports, while also providing electrical power for an accessory such as a printer, projector, scanner, or other device, through an un-switched power port. Accordingly, the load management system 200 can be helpful for charging notebook batteries, while still allowing use of the peripheral devices and accessories that are all powered using a single power source insufficient to fully power all connected devices simultaneously.

In some cases the load management system may be incorporated within a battery charging station, such as a desktop charging station (e.g., as in FIGS. 5A-5D) or a notebook charging cart (e.g., as shown in FIGS. 6 and 7). Embodiments of the invention are not limited to notebook applications, however, and may be directed to providing power for a wide variety of electrical devices (i.e., electrical loads). For example, the electrical loads 204 can include devices such as a tablet computer, a cell phone, a smart phone, a personal digital assistant, a camera, a music player, and/or a global positioning satellite (GPS) device, among others.

Figure 3:
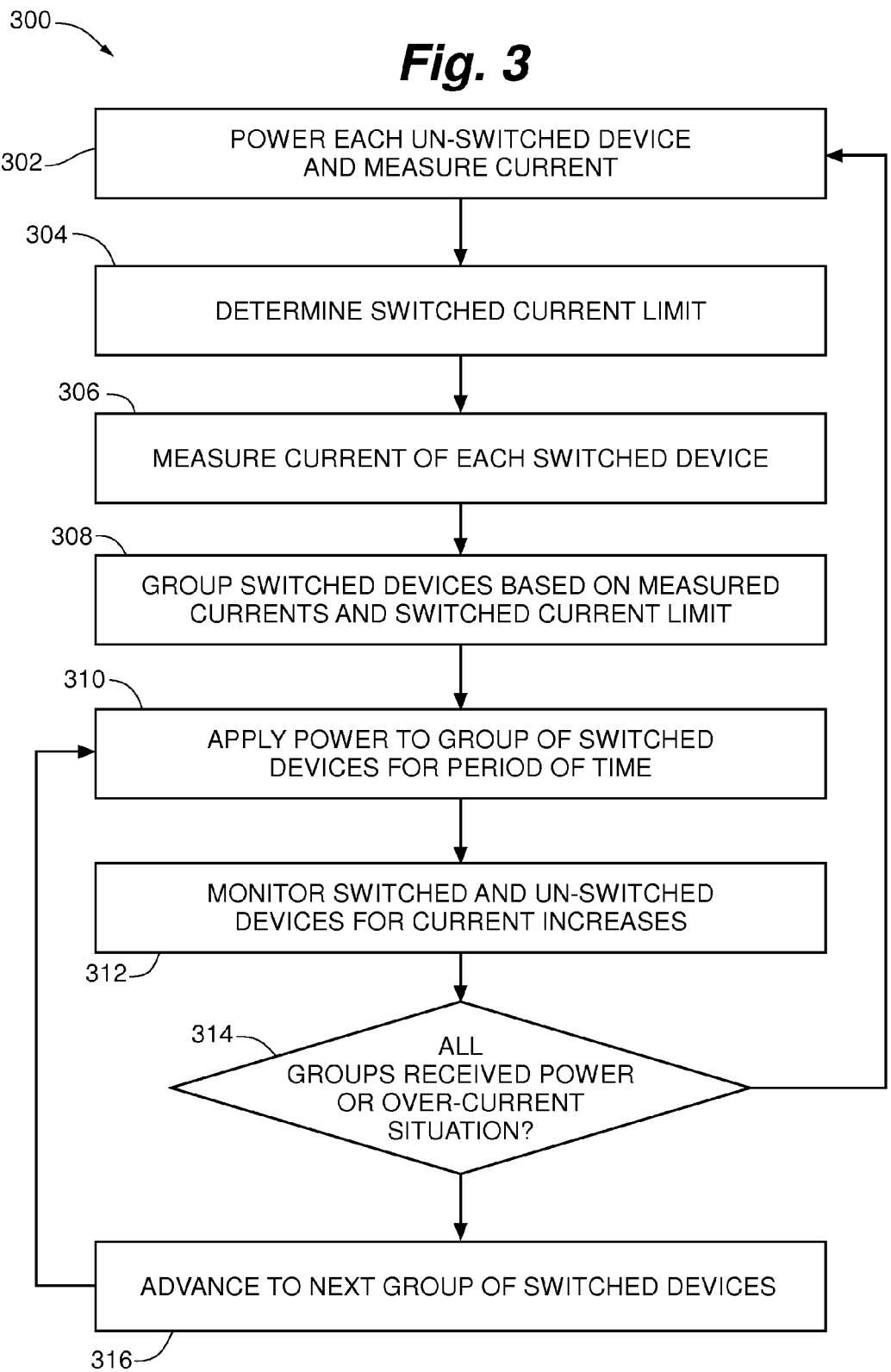
FIG. 3 is a flow diagram illustrating a method for applying power to a number of un-switched and switched electrical devices in accordance with an embodiment of the invention.

FIG. 3 is a flow diagram illustrating a method 300 for applying power to a number of un-switched and switched electrical devices in accordance with an embodiment of the invention. According to one embodiment, the method 300 can be implemented with a controller configured to perform the steps in the method, such as the controller 208 described with respect to the load management system 200 in FIG. 2. According to one aspect, the illustrated method 300 generally enables a power distribution scheme in which a limited amount of available input power is distributed among a number of intermittent, switched loads, and if applicable, one or more continuous, un-switched loads. In some cases the method 300 also allows for prioritizing distribution of the input power. For example, in some cases priority is given to certain un-switched loads to provide full operation on-demand. In some cases power remaining after providing for the un-switched loads is applied to lower priority loads and may be switched between a between groups of lower priority loads to maximize the capability of the remaining input power.

Returning to FIG. 3, in this example the method 300 generally includes measuring and/or determining the current drawn by certain loads, grouping a number of switched loads based on the current measurements/determinations, and then applying power to the groups of switched loads one at a time. While a number of steps are illustrated in an order in FIG. 3, it should be appreciated that the steps in the method need not necessarily be performed in the illustrated order. In addition, while the method 300 is discussed in terms of applying power to "devices", it should be understood that the method is considered applicable to electrical loads in general.

In cases in which power is to be applied to un-switched or continuously powered loads, a first step in the illustrated method 300 can include providing power to any un-switched devices and measuring the current drawn by those devices (302). Referring to FIG. 2, this step could include, for example, applying electrical power to the auxiliary power output 212 and then measuring the current drawn by the auxiliary output 212 using the current sensor 216 coupled to the controller 208. In addition, this step could include deactivating the switches 206 and applying electrical power to the networking power output 214 and then measuring the current drawn by the output 214 with the first current sensor 210 coupled to the controller 208. After measuring or otherwise determining the currents (302), the current values may be stored in memory for future use.

Returning to FIG. 3, the method 300 further includes determining a switched current limit (304) for use in grouping electrical loads/devices. As referenced above, a switched current limit is a determined threshold that represents a limit for the amount of electrical power that is available for switched loads at any one time. The switched current limit can be determined using a number of factors, including, for example, the current capacity or a current limit of the electrical power input as well as currents drawn by un-switched loads and measured in step 302. According to one embodiment, the switched current limit is calculated by determining the current capacity/limit of the electrical power input and then subtracting any measured or otherwise known currents associated with un-switched loads.

In some cases determining the switched current limit (304) also includes adjusting the switched current limit to account for variations in line voltage received at the electrical power input. For example, during operation, changes in line voltage affect the available source current. To account for this type of variation, the switched current limit can be adjusted down (e.g., by 10-20%) to allow for increasing input currents due to input voltage drops caused by other loads on the source distribution lines. Providing this type of hysteresis can in some cases help prevent or reduce the likelihood of false alarms due to constant power switching among loads and re-checks of the currents when the load is near the maximum of the switched current limit. In some cases the switched current limit may also be set to account for variations in line voltage in different areas of the world, such as the U.S. or Europe. For example, some embodiments of the invention compensate for world voltage source ranges by automatically limiting the maximum current regardless of the line voltage.

Returning to FIG. 3, the method 300 also includes measuring the current drawn by each switched electrical load or device (306). For example, referring to FIG. 2, the controller 208 is configured to measure the current associated with each of the switched power outputs 204 using the current sensor 210. After measuring the current drawn by each output, the measured currents can be saved in memory for future use.

With continued reference to FIG. 2, in some cases the current drawn by each output 204 is determined by switching on each output 204 one at a time, measuring the current drawn by the load coupled to the output, saving the measured current value, switching power off to that particular output, switching power to the next output, and starting the sequence over. This sequence allows for measuring the currents associated with the switched outputs 204 one at a time with the single current sensor 210. This method can also reduce the likelihood that too much power will be requested from the power input 202 during initialization of the power scheme, thus decreasing the risk of an early overcurrent fault.

In some cases a built-in delay is provided between switching power to each power output 204 and measuring the current drawn by the output. For example, the controller 208 may be configured to activate one of the switches 206 to apply power to a power output 204 and an associated load, and then wait for some time (e.g., several milliseconds) before measuring the current associated with that power output 204 and load. This procedure can help account for variations in how different electrical loads power up (e.g., to account for ramping currents, etc.) and ensure that accurate current measurements are made for each power output 204.

Returning to FIG. 3, after the currents of each switched device are measured (306), the currents associated with any un-switched loads are measured (302) and the switched current limit is determined (304), the method 300 further includes grouping (308) the switched outputs and associated electrical loads into one or more load groups based on the switched current limit and the measured currents. The load groups are thus defined to include one or more of the switched outputs and corresponding switched electrical loads. Taking into account the determined switched current limit associated with the electrical power input, each group preferably includes a number of switched outputs and loads, but the sum of the measured currents associated with the selected outputs/loads does not exceed the switched current limit. Accordingly, upon switching power to a particular load group, the combined current draw of the outputs/loads within the load group will not be greater than the previously determined switched current limit.

A number of methodologies can be used to group the switched outputs and switched loads together and embodiments of the invention are not intended to be limited to only certain methods. According to some embodiments, the step 308 seeks to maximize the number of switched outputs and devices within a single load group so that as many possible switched outputs/loads will be powered at a time without exceeding the previously determined switched current limit. In certain embodiments different combinations of switched outputs/loads may be evaluated by adding the saved current measurements for a particular group of switched outputs/loads and comparing the result to the switched current limit. If the combined current draw is greater than the switched current limit, a smaller group or subset of the switched outputs/loads may then be evaluated. This approach may proceed until the largest combination of switched outputs/loads with a combined current draw below the switched current limit is determined. After determining the makeup of a first load group in this manner, the remaining switched outputs/loads can then be grouped into additional load groups in the same manner.

Following the grouping of the switched outputs and corresponding electrical loads, the method 300 includes applying power to each of the load groups (310). In some embodiments this involves activating switches to apply electrical power from the common power source to the load groups according to a power sequence. In certain cases the electrical power may be applied to each load group for a determined period of time before removing power from the load group and applying power to the next load group in the sequence. The sequence for applying power to the load groups can place the load groups in any desired order. In some embodiments the power sequence places the load groups in order from the load group with the greatest current draw not exceeding the switched current limit first to the load group with the lowest current draw last.

According to some embodiments, as power is removed from one load group and applied to the next load group in the power sequence, short delay is inserted between removal and subsequent application to limit inrush currents from multiple electrical loads being connected to the electrical power input at the same time. For example, in some cases the controller 208 of the system 200 shown in FIG. 2 may be configured to deactivate one group of switches 206, then delay approximately 100 ms, and then activate another group of switches 206 to apply power to another load group.

After applying power to one of the load groups in step 310, the method 300 determines whether all load groups have received power at step 314. If not, the method advances to the next load group in the power sequence (316) and switches power to the next load group. After all load groups have been powered according to the power sequence, the method 300 returns to the beginning of the process to re-measure the currents of the switched outputs and switched loads (306), re-measure the currents of each un-switched device (assuming the presence of one or more un-switched devices) and re-determine the switched current limit (304) to the extent necessary. Based on this updated information, the method re-groups (308) the switched outputs/loads. During re-grouping, the same procedure of maximizing the number of switched outputs/loads in each load group can be followed in certain instances. Using the same procedure during the second and subsequent iterations of this process can be especially useful for charging batteries. For example, as previous cycles increase the charge of the batteries, an increasing number of batteries (i.e., switched loads) can be included in the same load group. Depending upon the extent of the re-grouping, the power sequence may be revised to activate switches for applying power to the desired switched outputs/loads. The process of re-measuring currents and re-grouping switched outputs/loads continues as needed until power is no longer needed or a change in the process is necessary.

One type of event that can interrupt the method 300 described above is a change to the switched electrical loads and/or un-switched electrical loads that causes an increased current draw from the electrical power input above the switched current limit. According to some embodiments, the method 300 also includes monitoring (312) the switched and un-switched loads to determine if a current increase occurs. Although the monitoring step 312 is illustrated at a particular point in method 300, it is contemplated that in some embodiments the monitoring step 312 may be ongoing throughout the method 300, simultaneous with the other steps. Upon detecting (314) an increase in the current rising above the switched current limit, the method 300 may interrupt the current activities to once again start the process at the beginning so that the currents can be re-measured and the switched electrical loads can be re-grouped as necessary to prevent an immediate overcurrent event. In addition, the switched current limit can be adjusted as necessary based on the detected increase in current. For example, if a user abruptly turns on a device connected to an un-switched power output causing an increase in un-switched current flow, the switched current limit can be adjusted to reflect the decrease in available current for the switched loads, thus giving priority to the un-switched load.

Figure 4:
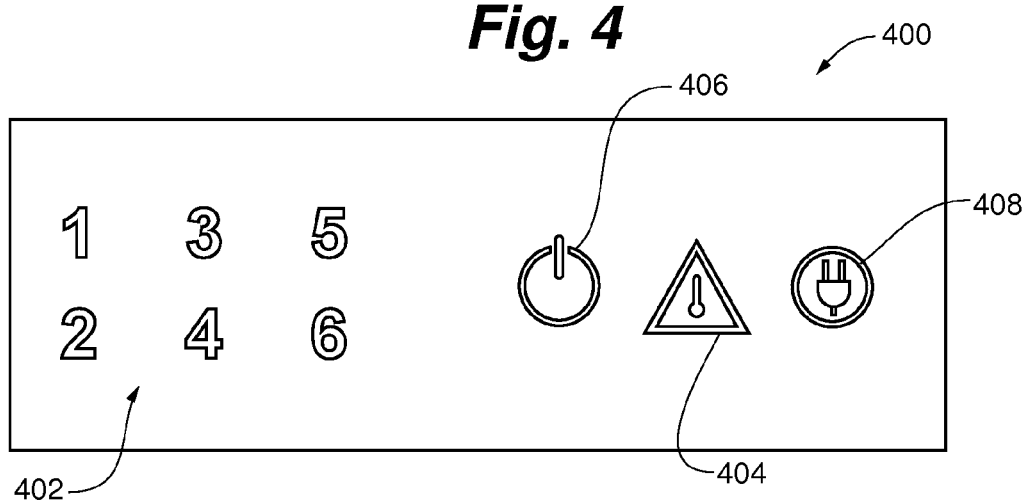
FIG. 4 is an illustration of an indicator panel for a load management system in accordance with an embodiment of the invention.
Figure 5A:
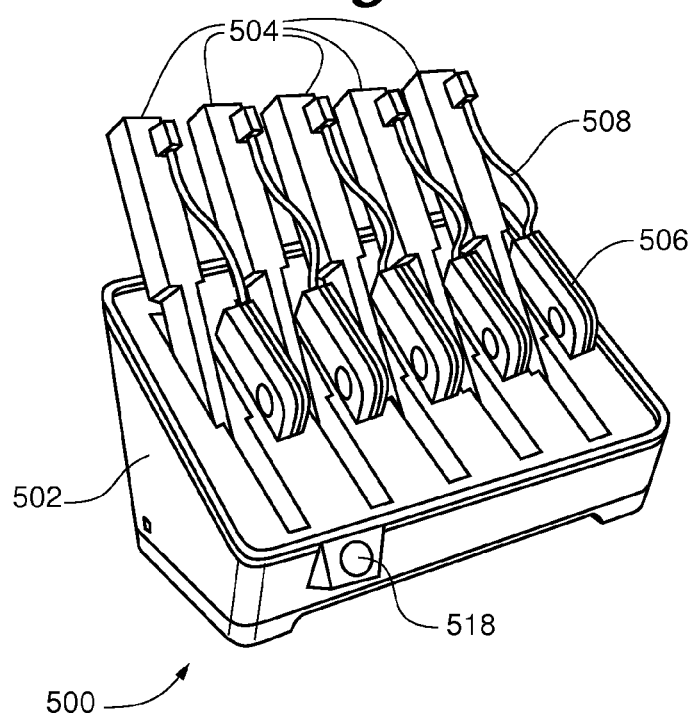
FIG. 5A is a perspective view of a charging station in accordance with an embodiment of the invention.

FIG. 4 is an illustration of an indicator panel 400 for a load management system in accordance with an embodiment of the invention. In some cases the indicator panel provides an indication to a user of the current state of the load management system, including scanning, powering, fault, etc. In some cases the load management system has the following modes:

Scanning
Powering
Fault
Not powered up
Powered up
Sensing something attached to the auxiliary power receptacle
Not sensing something attached to the auxiliary power receptacle.

The following description is just one possible example of an indication scheme. When the load management system measures currents for the attached loads/devices, the loads (1, 2, 3, 4 . . . ) that are being scanned are indicated by illuminating the number 402 that represents the load and flashing the number at a fast rate (e.g., ¼ second on, ¼ second off). In some cases the loads are individually scanned so there will never be more than one load number flashing at one time during the scan. Once scanning all switched loads is complete and the load groups that can be powered at one time are determined, those load groups will be powered on and indicated to the user by illuminating all of the applicable load numbers (1, 2, 3, 4 . . . ) with a slow flashing light (e.g., 1 second on, 1 second off). As discussed above, a load group can include any combination of switched loads, and thus any combination of load indicators 402 may flash.

In some circumstances, when there is a fault condition (e.g., overcurrent, high temperature, etc.), none of the load indicators 402 will be illuminated. If the fault condition is a high temperature, the high-temperature icon 404 will be illuminated and flashing (e.g., ½ second on, ½ second off). When the load management system is coupled with an input power source, a power-on icon 406 can be illuminated. When the system senses an attached load on its un-switched power output (e.g., an auxiliary power receptacle), the power plug icon 408 can illuminate. When there is nothing attached to the un-switched power output, or a load is attached and the power is sufficiently low (e.g., 0.2 amps) or the load power is off, the power plug icon 408 will not be illuminated.

Embodiments of the invention, including aspects related to the load management system 200 and method 300 for applying power described above can be implemented in a wide variety of application-specific embodiments. Embodiments of the invention are not limited to any particular application, but may be directed to providing and managing power for a wide variety of electrical loads, including, for example, electrical devices such as notebook and tablet computers, cell phones, smart phones, PDAs, cameras, music players, and/or GPS devices, among others. As one example, a load management system such as one described herein could be provided within or in conjunction with a vehicle power system in order to power and/or charge a number of devices (e.g., GPS, cell phones, video players, music players, etc.) within the vehicle.

As mentioned above, in some cases an embodiment of the invention may be incorporated within a battery charging station, such as a desktop charging station or a notebook charging cart. These particular applications will now be discussed in more detail.

FIGS. 5A-5D are perspective views of a notebook battery charging station 500 in accordance with an embodiment of the invention. As is known, most notebook/laptop computers have one or more removable batteries that can be disconnected and uncoupled from the laptop for charging, maintenance, replacement, etc. In some embodiments of the invention, the charging station 500 includes a housing 502 configured to receive and/or hold one or more laptop batteries 504. The charging station 500 also includes one or more corresponding charging circuits 506 and cables 508 and/or connectors 510 for coupling the one or more batteries 504 to the charging circuits 506. The charging station 500 can be configured to hold as many laptop batteries as desired. In some embodiments, the station holds at least 5 laptop batteries. In other embodiments, the station is configured to hold more than 10 batteries, (e.g., up to 20, 30, or 40 batteries).

Turning to FIG. 5D, the charging station 500 includes circuitry adapted to charge the one or more batteries coupled to the station. A power supply system can be provided for charging the plurality of batteries when received in the station. The power supply system is useful for recharging the batteries of the laptops. The power supply system includes a device to receive power into the cart, such as a male power cord extending from the cart or a female receptacle in or on the charging station. Embodiments of the power supply system include a power brick 520 that in some cases converts AC power to DC power which is ultimately routed to each laptop battery stored within the station 500. In some embodiments an external AC/DC power converter provides DC power that is received at the charging station. In some cases the charging circuitry includes one or more indicators, such as LEDS 518, that illuminate when the charging circuitry is currently in use.

In some embodiments the charging station 500 may be configured to receive entire laptops, rather than only a laptop battery. In such cases, a networking connection (e.g., Ethernet) can be provided for connecting the laptop computers to a network when stored in the charging station. Such a connection is useful for providing software updates to the laptops when they are not in use. Of course, the charging station 500 can provide each laptop with other connections. Further, one or more power outlets (not shown) can be provided on the exterior of the charging station 500 if desired. Such power outlets allow for accessories such as printers and projectors to be plugged into the charging station so that additional power cords do not have to be run from the station to the wall.

In some cases simultaneously charging many notebooks or notebook batteries can exceed the limited current capabilities of typical wall outlets found in homes, schools, and business, as set forth by the National Electrical Code and foreign equivalents. In addition, the power requirements of the multiple notebooks/batteries 504 can exceed the capacity of the DC power source 520 that provides the bulk charge current for the battery charging electronics. According to some embodiments, the charging station 500 incorporates a load management system, such as the system 200 illustrated in and described with respect to FIG. 2. The load management system interfaces between the DC power source 520 and the charging circuits 506 to manage the electrical power received from the power source 520 and distribute it to the charging circuits and thereafter the batteries 504 in the manner described above without exceeding the branch-circuit current capability as set forth in the National Electrical Code or the capability of the local DC power source. Referring briefly to FIG. 2, for example, the power source 520 of the charging station can interface with the load management system 200 at the electrical power input 202, although a hardwired or other connection may be used. In a similar fashion, each of the charging circuits 506 can interface with each of the electrical power outputs 204 though, e.g., a hardwired or other connection. In addition, the un-switched auxiliary power output 212 can be coupled to an exterior power outlet to the extent one is included with the charging station 500.

FIGS. 6A-6D are views of a laptop charging/storage cart 600 in accordance with an embodiment of the invention. FIGS. 7A-7B are perspective views of another laptop cart 700 in accordance with another embodiment of the invention. The carts can include any structure useful for holding a plurality of laptop computers or other mobile computing devices and providing power and/or network connectivity to the laptop computers. Multiple examples of carts that can be useful for storing and/or charging laptop computers and other mobile computing devices are disclosed in co-owned and copending U.S. patent application Ser. No. 13/025,782, the entire content of which are hereby incorporated herein by reference.

Returning to FIGS. 6A-7B, as shown, the carts 600, 700 can each include a cabinet 630 defining an interior space for storing a plurality of laptop computers. The interior space may in some cases include a laptop docking station 650 for each laptop disposed in the cart. As shown in FIGS. 6A-7B, in some embodiments the cabinets 630 include a door assembly 670 having one or more doors to close the interior space bounded by a top, bottom, and four sides. Such doors can be of any style including, sliding, openable from the top, or swingable outwardly. In some embodiments, the door may optionally be locked to secure the mobile computing devices within the cart. In some embodiments, wheels 610 can be positioned on an underside of the cabinet 630 to facilitate easy movement of the carts. Further, handles 620 can be provided to facilitate the movement of the cart.

Figure 6B:
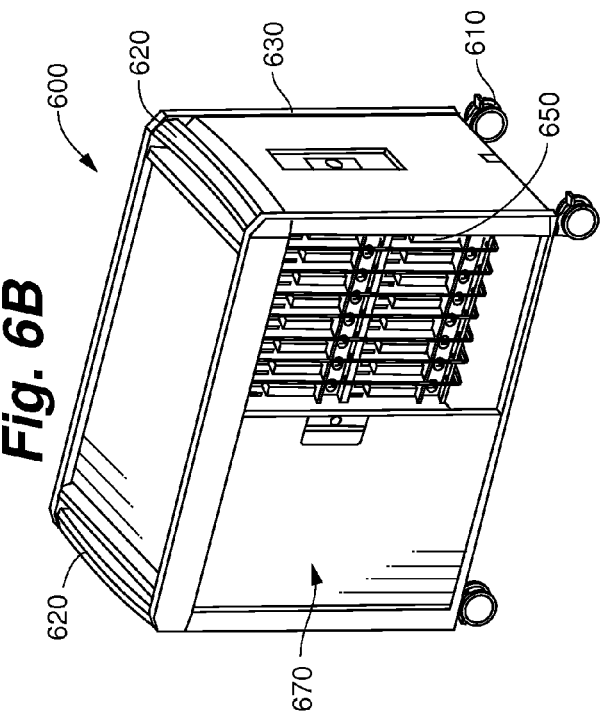
FIG. 6B is a front perspective view of the cart of FIG. 6A.
Figure 6D:
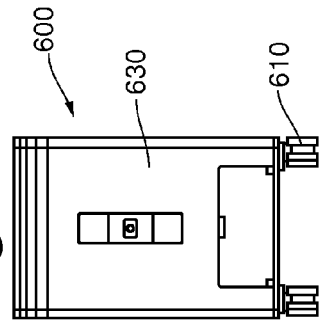
FIG. 6D is a side plan view of the cart of FIG. 6A.
Figure 6A:
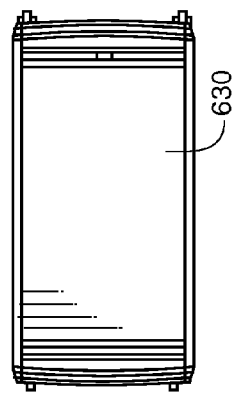
FIG. 6A is a top plan view of a cart in accordance with an embodiment of the invention.
Figure 6C:
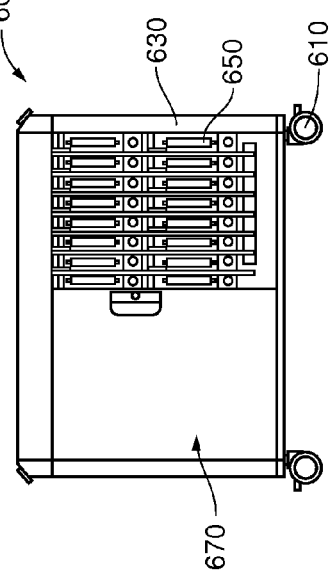
FIG. 6C is a front plan view of the cart of FIG. 6A.

As shown in FIGS. 6B-6C, a plurality of docking stations 650 can be configured to hold the laptop computers in a generally vertical position, or as shown in FIG. 7A, the plurality of docking stations 650 can be configured to hold the laptop computers in a generally horizontal orientation positioned on a shelf 654. The carts can be configured to hold as many laptops as desired. In some embodiments, the carts hold at least 10 laptop computers in their interior spaces. In other embodiments, the carts are configured to hold between 10 and 40 (e.g., 20 and 30) laptops in their interior spaces.

Further, as shown in FIGS. 7B-7D, one or more auxiliary power outlets 730 can be provided on the exterior of any cart. Such power outlets allow for accessories such as printers and projectors to be plugged into the cart so that additional power cords do not have to be run from the cart to the wall. FIGS. 7C-7D are front perspective views of auxiliary power outlets 730 having a cover 790 (in the open position) to reduce the likelihood that foreign objects will be placed in the auxiliary power outlet 730. In FIG. 7C, the cover is open to provide access to a United States style power outlet, while in FIG. 7D the cover is open to provide access to a European style power outlet.

An network connection (e.g., Ethernet) system (not shown) can be provided for connecting the plurality of laptop computers to a network when stored within the interior space. The network connection system includes at least one device for a cart to communicate with the network. In some embodiments, this device includes a wire extending from the cart. In other embodiments, the cart includes a wireless transmitter that allows the cart to communicate with the network. Ultimately, the cart allows for communication between each laptop stored in the cart and the network. Such a connection is useful for providing software updates to the laptops when they are not in use. In general, these systems are internal to a cart and are not easily accessible to users. Of course, the carts 600, 700 can provide each laptop with other connections.

In some embodiments, a cart includes an air circulation system to cool the plurality of laptop computers when they are in the interior space. The air circulation system can include at least one fan 770 disposed in an outer surface of the cabinet 630 to facilitate air exchange between the interior and the exterior of the cabinet. In some embodiments, one or more passive vents are provided in the exterior of the cabinet to facilitate air circulation.

A power supply system can be provided for charging the plurality of laptop computers when stored within the interior spaces of the carts 600, 700. Each power supply system includes a device to receive power into the cart, such as a male power cord extending from the cart or a female receptacle in or on the cart. Embodiments of the power supply system convert AC power to DC power and ultimately route the power to each laptop stored within the carts 600, 700. The power supply system may also route power to other subsystems within the carts 600, 700, including the auxiliary outlets, networking circuitry, and/or air circulation system described above.

As noted above with respect to the charging station 500 illustrated in FIGS. 5A-5D, in some cases simultaneously charging many notebooks or notebook batteries can exceed the limited current capabilities of typical wall outlets found in homes, schools, and business, as set forth by the National Electrical Code and foreign equivalents. In addition, the power requirements of the multiple notebooks/batteries 504 can exceed the capacity of the DC power source 520 that provides the bulk charge current for the battery charging electronics. These same limitations can also affect the performance of laptop charging/storage carts, such as the carts 600, 700 described herein.

According to some embodiments, the power supply system of a laptop cart incorporates a load management system, such as the system 200 illustrated in and described with respect to FIG. 2. In certain embodiments, the load management system interfaces between the AC input box of the power supply system and the various subsystems within the cart powered by the power supply system. The load management system manages the electrical power received from the AC input and distributes it to the docking stations 650 within each cart 600, 700, as well as to the auxiliary outlets, networking circuitry, and/or air circulation system described above. As described above (e.g., with respect to FIGS. 2-3), the load management system is configured to distribute electrical power to these systems within the carts 600, 700 without exceeding the branch-circuit current capability as set forth in the National Electrical Code.

Figure 8:
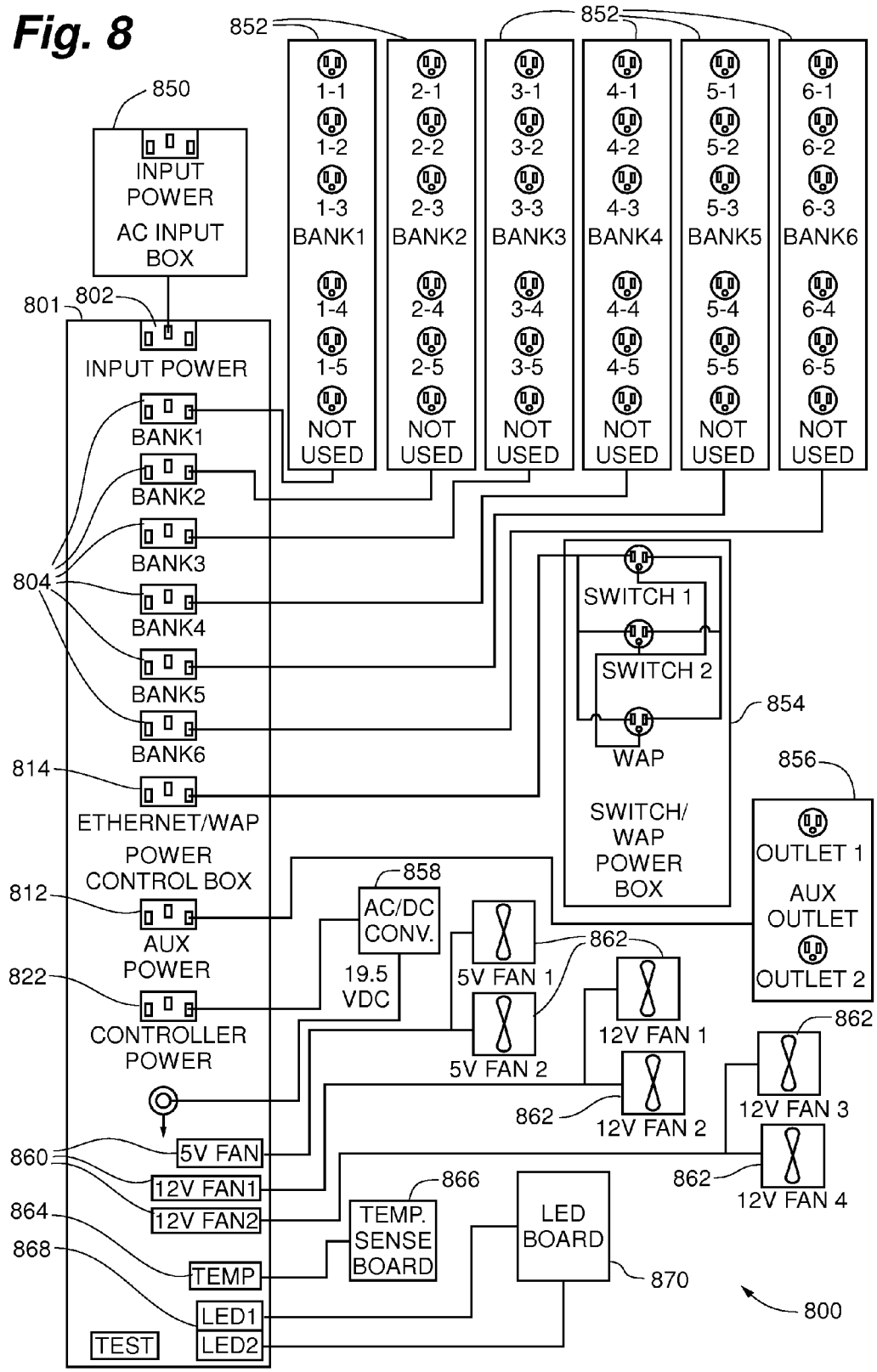
FIG. 8 is a high-level schematic of a power supply system for a notebook charging cart in accordance with an embodiment of the invention.

FIG. 8 is a high-level schematic of a power supply system 800 for a notebook charging cart in accordance with an embodiment of the invention. As just one example, the power supply system 800 can be incorporated within either of the carts 600, 700 discussed above. The power supply system 800 includes an AC input box 850 that is configured to receive power into the cart, and may include a female receptacle in or on the cart or a male power cord extending from the cart. The AC input box 850 is coupled to a load management system 801, also referred to in this example as a power control box. The load management system 801 manages the power received from the AC input box and distributes it to a number of subsystems within the power supply system. According to an embodiment of the invention, the load management system 801 provides functionality similar to the system 200 described with respect to FIG. 2.

For example, the load management system 801 includes an electrical power input receptacle 802 that couples with the AC input box and receives electrical power from the AC input box. The system 801 also includes a number of switched power output receptacles 804, which are coupled to a number of power extension strips 852. Each extension strip 852 includes multiple female power receptacles for plugging in up to five laptop computers (in this embodiment a sixth receptacle is not used), thus providing power for up to thirty laptop computers within the cart. The load management system 801 also includes a networking power output 814 which is coupled to a networking power box 854, and an auxiliary output 812 which is coupled to an auxiliary outlet 856. The load management system 801 receives operating power from an AC/DC converter 858 through a power input 822. In addition, in this embodiment the load management system 801 also includes three power outputs 860 coupled to a number of fans 862 which make up part of an air circulation system of the cart. Further, the load management system 801 includes a power output 864 for powering a temperature sense board 866, and power outputs 868 for powering an LED indication board 870.

As discussed above with respect to FIG. 2, the load management system 801 in FIG. 8 includes a controller that is configured to distribute the available electrical power from the power input 802 to the switched power outputs 804 by grouping the power outputs 804 and then selectively applying the electrical power to the groups of power outputs (and by extension, the power extension strips 852 and laptops coupled thereto) according to a power sequence. As with the system 200, the load management system 801 also provides un-switched (e.g., continuous) electrical power to one or more power outputs, including in this case the auxiliary power output 812 and the networking power output 814, as well as the power outputs 860, 864, and 868 for the air circulation system fans 862, the temperature sense board 866, and the LED indication board 870, respectively. Of course any number of additional power outputs can be included in the load management system 801, and any combination of the outputs can be switched or un-switched depending upon, for example, the importance of the functions provided and the desirability of providing those functions uninterrupted, e.g., un-switched.

As discussed with respect to the system 200, the system 801 also includes a number of current sensors (not shown) coupled to the switched power outputs 804 and the un-switched power outputs to help determine the currents drawn by the various subsystems coupled to the load management system 801. The controller (not shown) can then use those currents, along with a current limit of the power source to group the switched outputs and apply power to each of the switched outputs according to a determined power sequence as discussed above with respect to the system 200. Accordingly, the load management system 801 allows the power supply system 800 to prioritize electrical power distribution for un-switched loads, while providing the remaining available power to the laptop computers through the switched power outputs 204 in an efficient, sequenced charging scheme.

According to certain embodiments of the invention, a load management system is configured to monitor the currents of the notebook computers or individual batteries and group them in an efficient way to charge the most notebooks/batteries at the same time without exceeding the branch circuit current limits or bulk power source limits. After a specified period of time, the system switches power from a first grouping of notebooks or batteries to a second grouping of notebooks/batteries and provides power to the second group for a specified period of time. As many groups as desired can be provided, depending on the number of notebooks the cart is adapted to hold. This monitoring of current and grouping continues until all notebooks or batteries are removed from the cart/charging station or the charging is completed. If additional notebooks or batteries are added to the cart/charging station, the currents may be measured again and notebooks and batteries can be re-grouped if necessary for optimal charging. According to some embodiments, a system that couples to full laptop computers, may automatically switch the Ethernet connections on by applying power to them after the charging is completed the system so the notebooks can be managed after they have sufficient charge.

According to certain embodiments, a load management system also monitors to see if an external device is plugged into any provided auxiliary power receptacles. If the system detects such an external device it can give the device top priority and automatically remove or reduce power to the notebooks, batteries, networking circuitry, and other lower priority subsystems. If the system detects the external device has been removed, it can begin applying power to the other subsystems. Accordingly, in some embodiments a system automatically and selectively directs power to an external device, notebook/battery charging systems, and notebook management systems, in that order of priority. Further, in some embodiments, the system monitors the temperature of the cart or charging station and if it detects an over-temperature situation, it removes power to all notebooks and/or batteries. In some embodiments, the controller automatically re-applies power when the over temperature situation has been corrected. In some embodiments there is at least a 30 mS delay before an over temperature detection to prevent a false indication during electromagnetic interference events. An indication to the user of an over temperature situation can be provided by a blinking LED on an LED indication board.

Figure 9A:
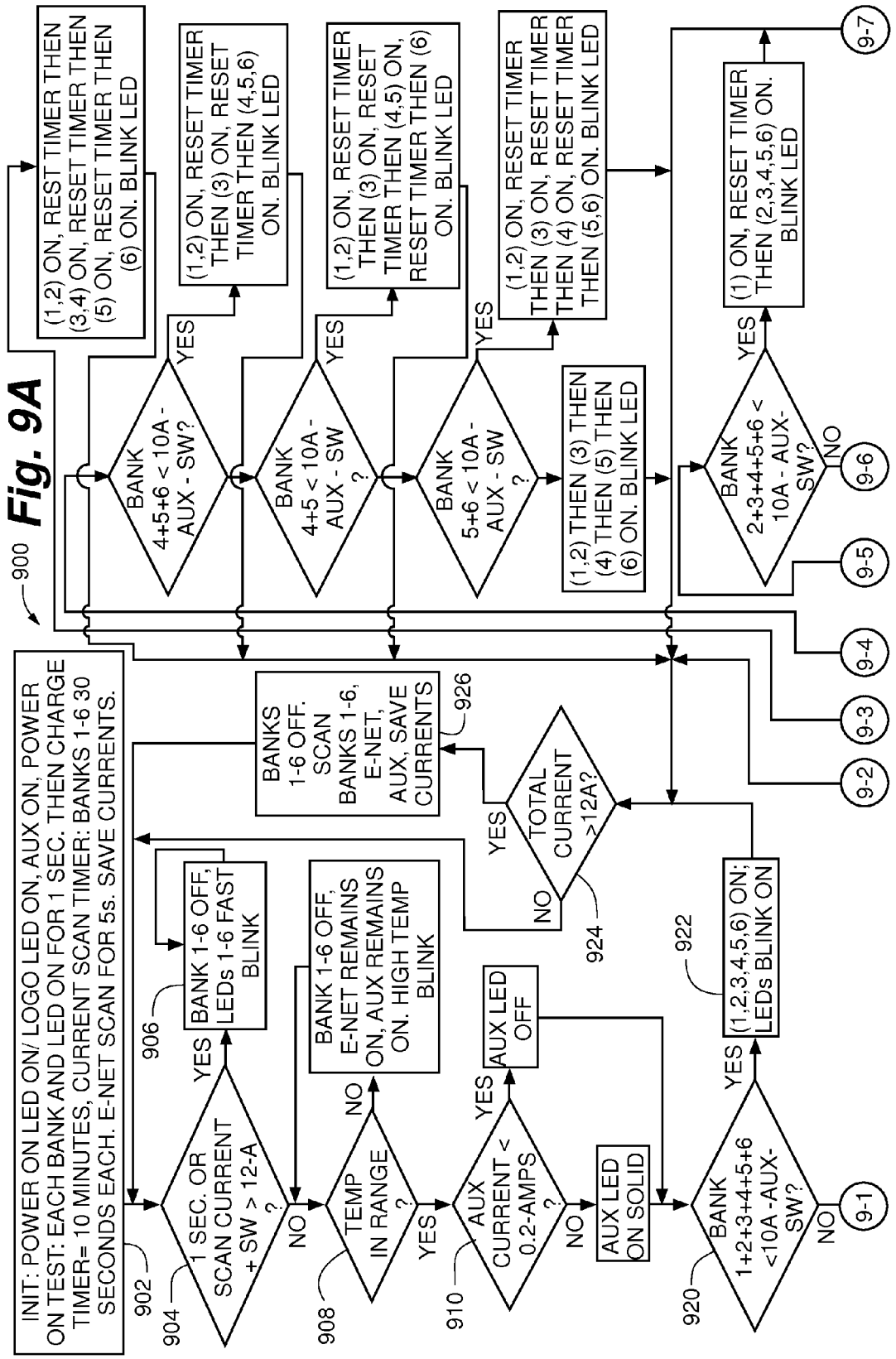
Figure 9C:
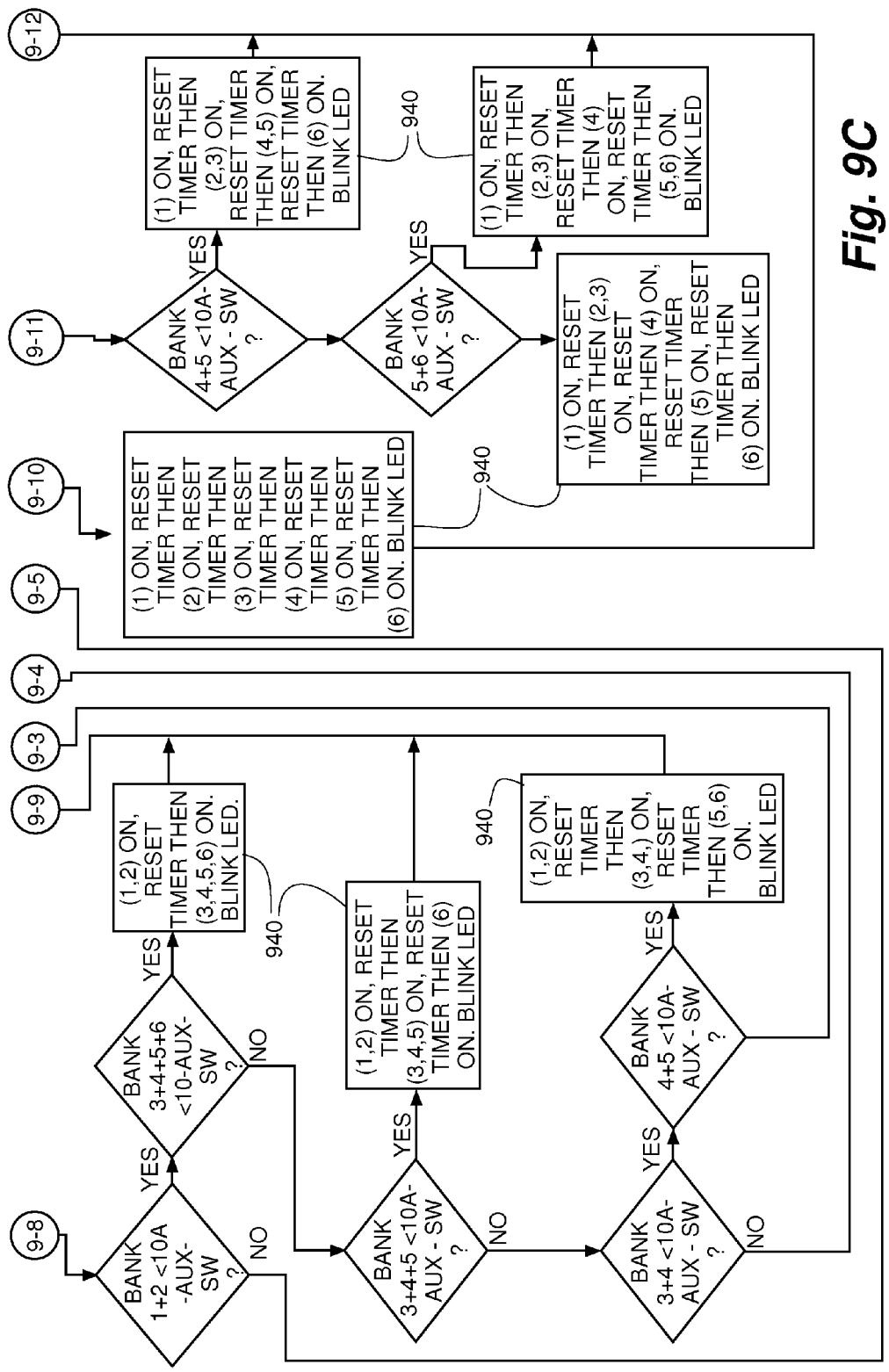
Figure 10A:
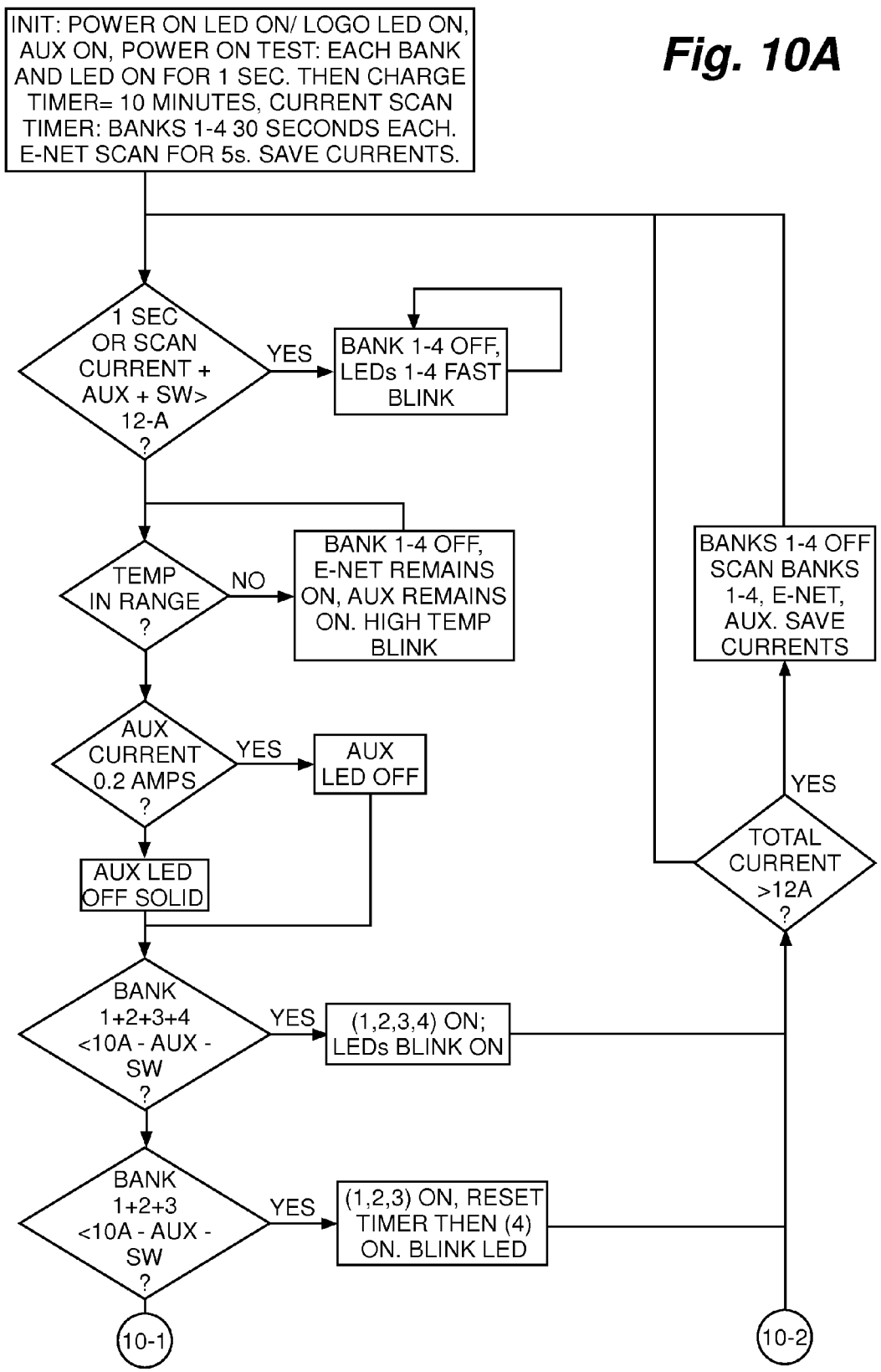
FIGS. 10A-10B are a flow diagram illustrating a method of charging multiple notebook computers in accordance with an embodiment of the invention.
Figure 10B:
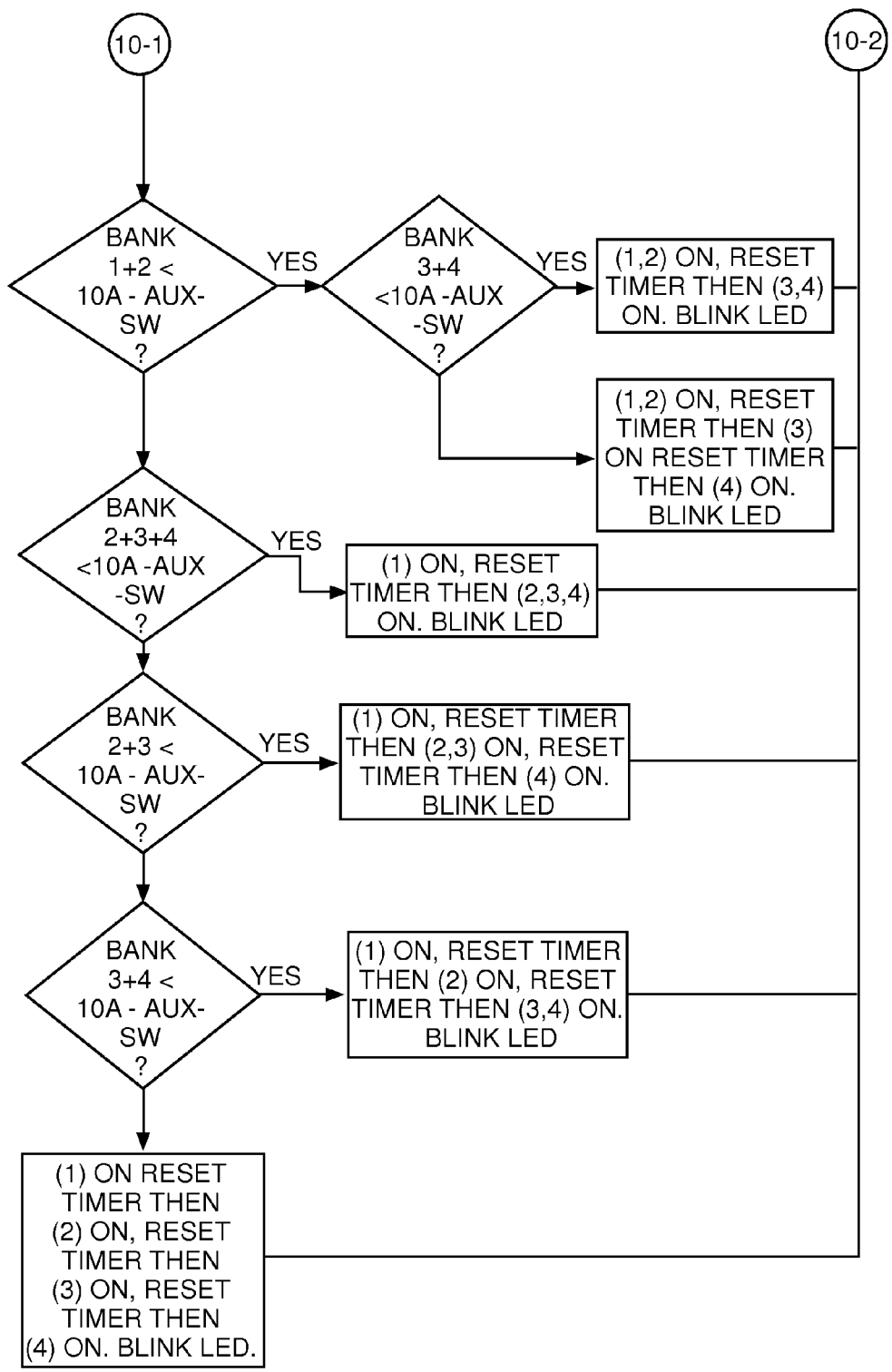

FIGS. 9A-9C are a flow diagram 900 illustrating steps and decision points for charging multiple notebook computers in accordance with an embodiment of the invention. The flow diagram 900 generally illustrates a methodology for charging thirty notebook computers in a setting with a 100/110/120 Volt, 15 Ampere ("Amp") input power source, and corresponds to the embodiment of the power supply system 800 described with respect to FIG. 8. The charging methodology begins with an initialization setup 902. The initialization setup 902 begins upon an initial powering on of the power supply system and load management system. First steps in the initialization setup 902 include turning on a Power On LED, a logo LED, and the auxiliary power output.

The initialization sequence then completes an initial test of the load management system 801 to determine if any overcurrents exist prior to initiating the charging sequence. During the test, each switched power output 804 is turned on for one second, along with a corresponding coupled power extension strip 852 and any coupled notebook computers. FIGS. 9A-9C refer to a switched power output and extension strip as a "bank". A charge timer is then set to ten minutes and the current of each bank (i.e., switched power output 804 and extension strip 852) is scanned for thirty seconds each. Following is a five-second current scan of the networking power output 814. Following the scans, the measured currents are saved to memory.

The charging methodology of FIGS. 9A-9C includes a first query 904 of the currents measured during the initial scan in the setup 902 to determine if an initial overcurrent is present. The first query 904 checks if the currents measured during the one second scan or the thirty second scan in addition to current detected on the auxiliary power output ("AUX") and the networking power output ("SW") are greater than twelve Amps. The query uses twelve Amps as the comparison point because the National Electrical Code (NEC) sets the limits for 15-amp site branch wiring to 12-amps. (The foreign equivalent for 10-amp branch circuits is 8-amps.) Accordingly, devices plugging into wall receptacles cannot exceed 12 Amps in North America. If the measured currents are greater than 12 Amps, the load management system enters an endless loop 906 in which the LEDS are flashed at a rapid rate to indicate the overcurrent event.

If the measured currents are less than or equal to 12 Amps, a second query 908 is made to determine if the system's temperature is within a desired range. If not, the system turns off the switched power outputs (i.e., Banks 1-6) and flashes the High Temp LED. If the system is within temperature range, then the auxiliary current is compared to 0.2 Amps in query 910 to make a determination as to whether or not an external device coupled to the auxiliary power output is turned on and the system illuminates the AUX LED at 912.

Following these initial evaluations, the charging methodology begins comparing the currents measured on each switched power output in order to group the power outputs into one or more load groups and then apply power to the load groups. The methodology follows an iterative approach in which different combinations of switched power outputs are compared to a switched current limit to determine the groupings. In this case, the switched current limit is equal to ten Amperes less the currents on the auxiliary and networking outputs (10A−AUX−SW). Ten Amperes is used instead of the actual NEC limit of twelve amperes in order to add in hysteresis around the threshold to avoid constant switching when levels near the threshold.

The comparisons begin with query 920, in which it is determined whether a combination of all six switched power outputs (all six "banks") has a combined current less than the switched current limit. If they do, only one load group is formed including all the banks and this is powered on for a ten minute period at 922. After the ten minute period expires, the process starts over again. If at any time during the current comparisons the total current is greater than twelve amps (query 924), the process is immediately interrupted to re-measure the various currents (step 926) and start the grouping process over.

If the current on all six banks is not less than the switched current limit at query 920, then the comparison continues at query 930 in which it is determined if the first five banks have a combined current less than the switched current limit. If so, a first load group including the first five banks is powered for ten minutes at 932, and then a second load group including only bank six is powered for ten minutes.

As can be seen in FIGS. 9A-9C, according to this embodiment, a large number of load groupings (defined in rectangular boxes 940) are possible according to the illustrated charging methodology depending upon the currents measured on each individual switched power output, as well as the currents measured on the AUX and SW outputs. In addition, in this embodiment the query 924 is continuously made throughout the various current comparisons and if at any time the combined total current is greater than twelve Amps, then the sequence is interrupted and the currents are re-measured in order to re-group the power outputs into load groups whose current does not exceed the switched current limit.

Figure 11A:
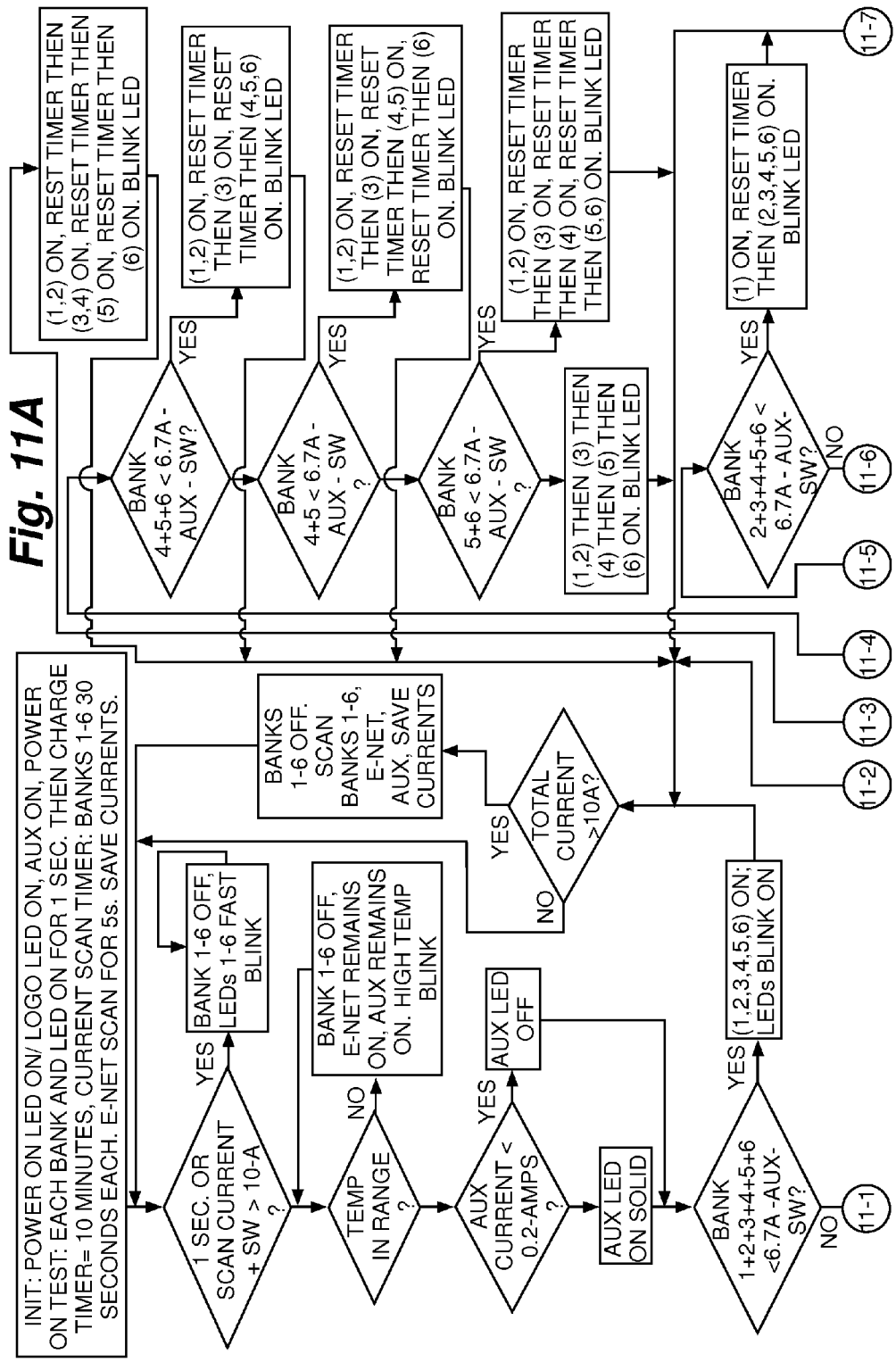
FIGS. 11A-11C are a flow diagram illustrating a method of charging multiple notebook computers in accordance with an embodiment of the invention.
Figure 11B:
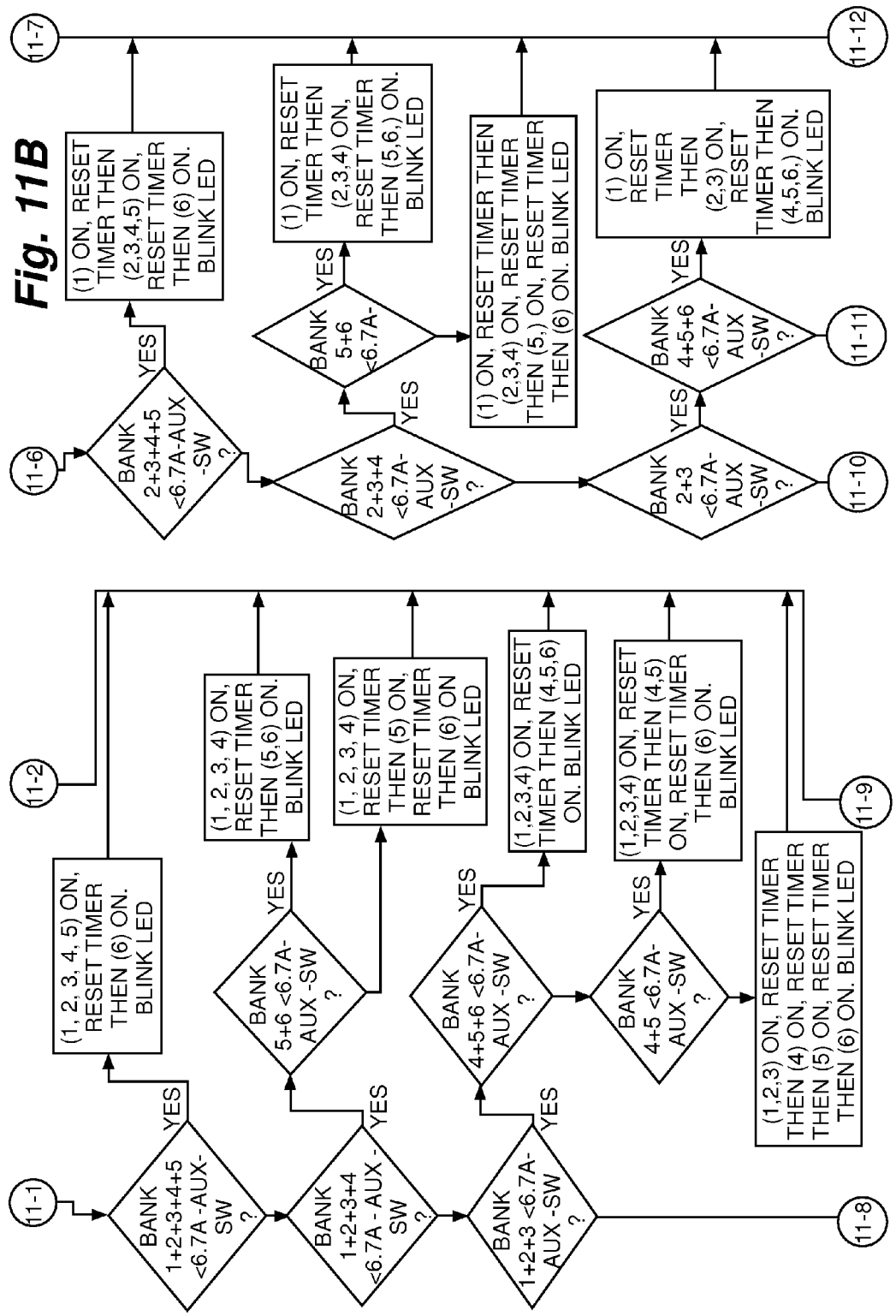
Figure 11C:
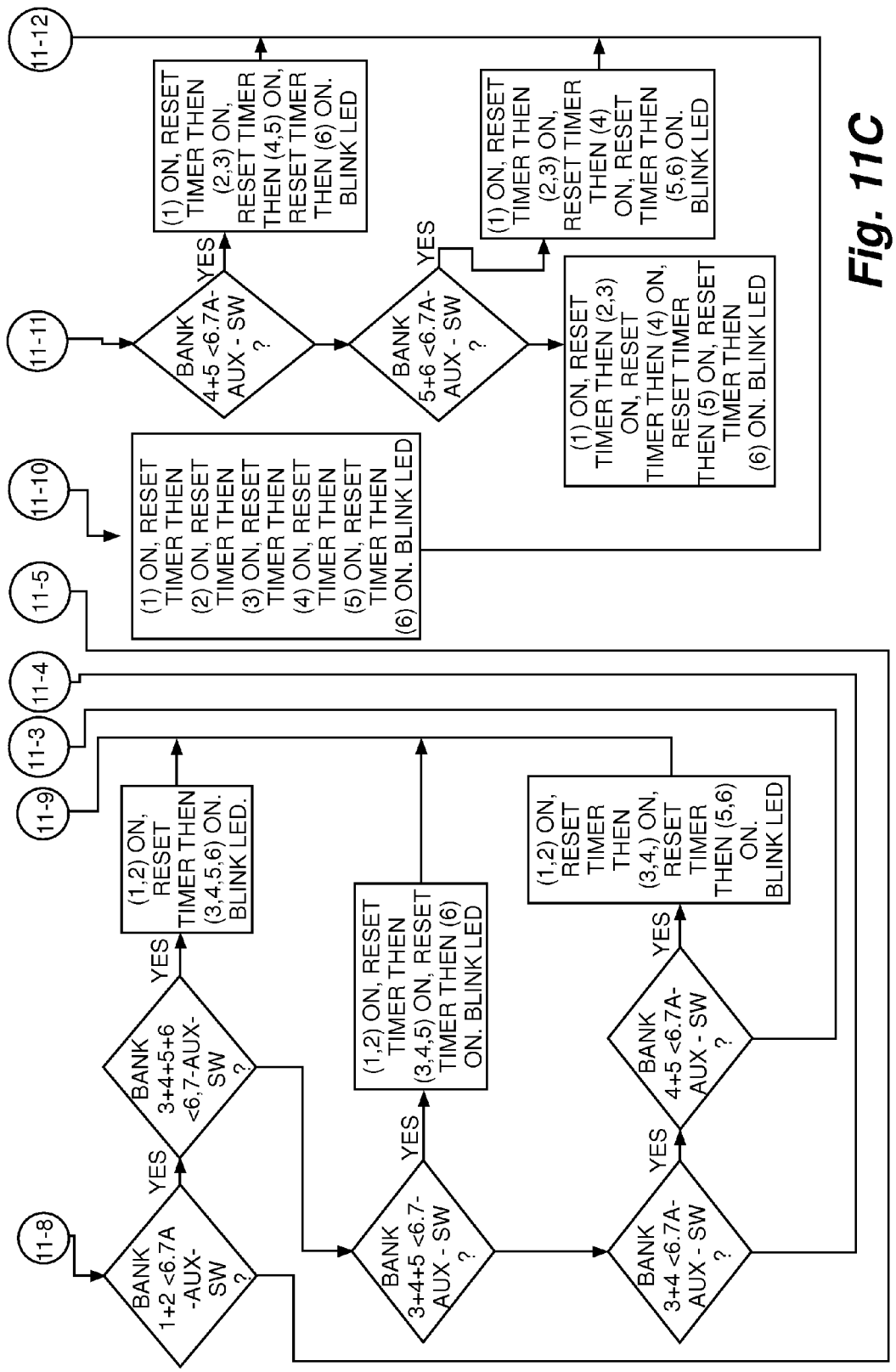
Figure 12A:
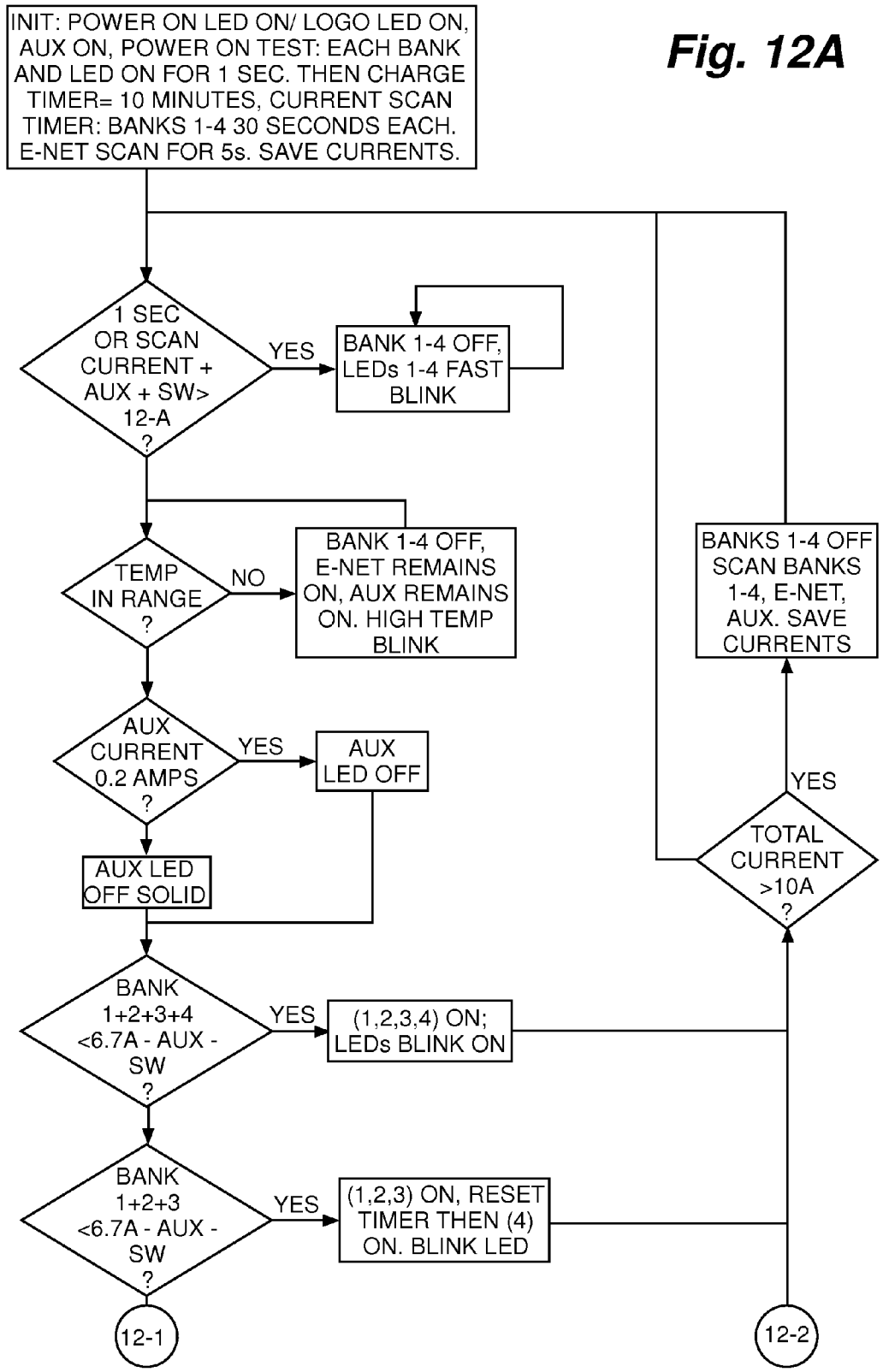
FIGS. 12A-12B are a flow diagram illustrating a method of charging multiple notebook computers in accordance with an embodiment of the invention.
Figure 12B:
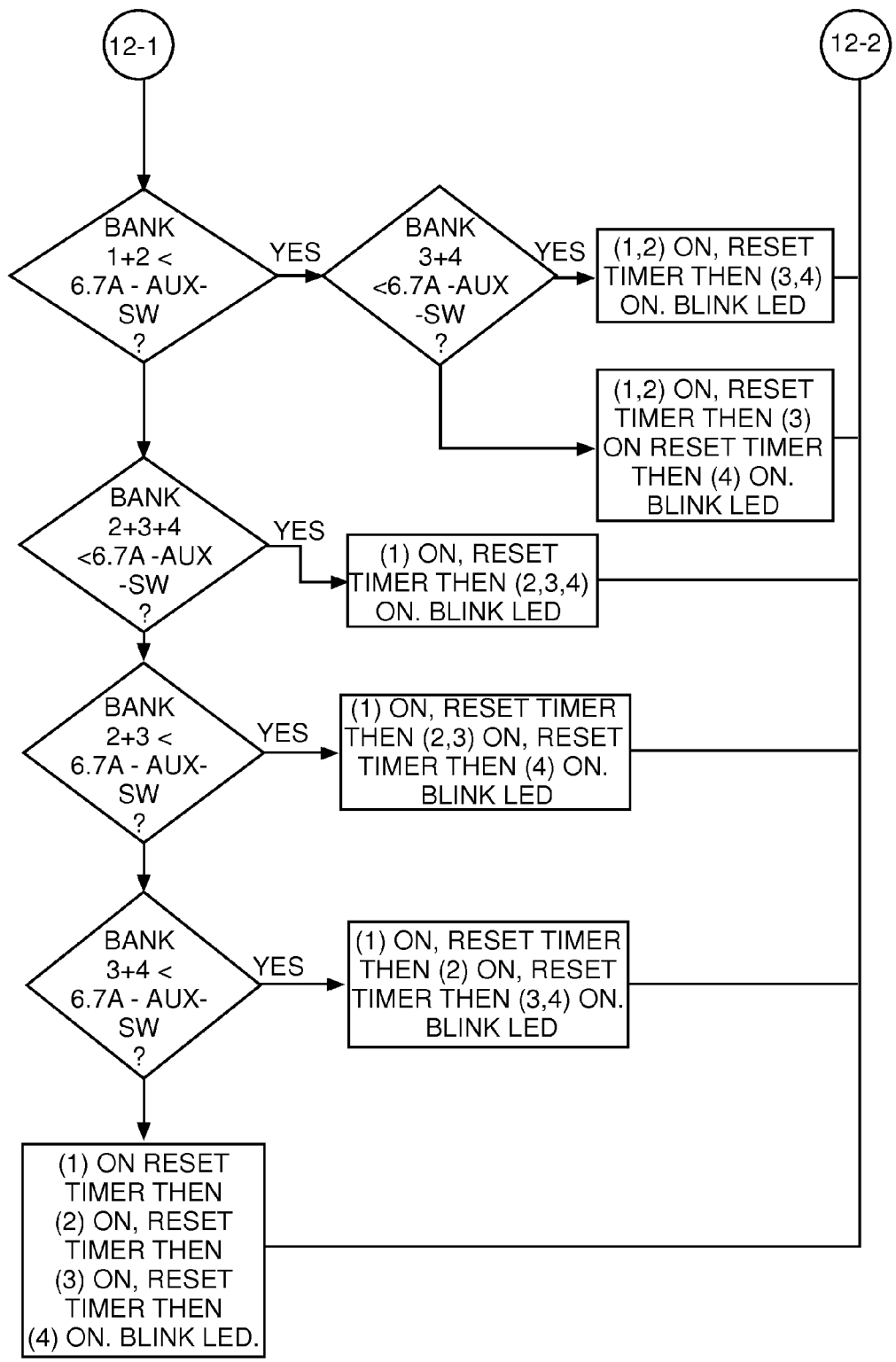

FIGS. 10A-10B, 11A-11C, and 12A-12B illustrate additional charging methodologies similar in many respects to the methodology illustrated in FIGS. 9A-9C. The methodology of FIGS. 10A-10B corresponds to a computer cart with twenty laptop computers being powered with a 100/110/120 Volt, 15 Amp input power source. FIGS. 11A-11C, and 12A-12B correspond to computer carts powered by a 220/230/240 Volt input source. FIGS. 11A-11C illustrate a thirty-notebook methodology, while FIGS. 12A-12B illustrate a twenty-notebook methodology.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. An electrical load management system for charging batteries, comprising:
   an electrical power input configured to couple the load management system with a common power source;
   a plurality of electrical power outputs configured to couple the load management system with a plurality of electrical loads, each electrical load comprising a battery to be charged;
   a plurality of switches coupled between the power input and the power outputs;
   a first current sensor coupled to the power outputs for sensing a current drawn by one or more of the power outputs; and a controller coupled to the plurality of switches and the first current sensor, the controller configured to:

determine a switched current limit defining a limit for current drawn by the electrical power outputs;

carry out an iterative grouping process in which the controller is configured to measure with the first current sensor a current drawn by each of a plurality of electrical loads respectively coupled to the plurality of electrical power outputs, each electrical load comprising a battery to be charged, group the plurality of power outputs and respective electrical loads into a plurality of load groups such that a sum of the measured currents of the electrical loads in each load group does not exceed the switched current limit, the grouping comprising forming a first load group with a maximum number of the power outputs and respective electrical loads, then forming a second load group with a maximum number of the power outputs and respective electrical loads not in the first load group, and then continuing to form additional load groups as long as any of the power outputs and respective electrical loads remain ungrouped, each successive additional load group having a maximum number of the currently ungrouped power outputs and respective electrical loads, operate the plurality of switches to apply electrical power from the common power source to each of the load groups to charge the batteries forming at least part of the electrical loads within each of the load groups, and to apply the electrical power to only one load group at a time while removing the electrical power from the other load groups, and restart the iterative grouping process after applying electrical power to each of the load groups; and continue the iterative grouping process at least until all of the plurality of power outputs and respective electrical loads are combined in one load group.

2. The system of claim 1, further comprising an indicator coupled to the controller, wherein the controller is configured to activate the indicator based on a state of the system.

3. The system of claim 1, further comprising a temperature sensor coupled to the controller, wherein the controller is further configured to receive a temperature signal from the temperature sensor and activate one or more of the plurality of switches to turn off one or more of the power outputs based on the temperature signal.

4. The system of claim 1, wherein the electrical power input is configured to couple the load management system with an alternating current (AC) power source, the plurality of switches are configured to switch AC power, and the plurality of electrical power outputs are configured to couple the load management system with a plurality of electrical loads requiring AC power.

5. The system of claim 1, wherein the electrical power input is configured to couple the load management system with a direct current (DC) power source, the plurality of switches are configured to switch DC power, and the plurality of electrical power outputs are configured to couple the load management system with a plurality of electrical loads requiring DC power.

6. The system of claim 1, further comprising an un-switched power output coupled to the electrical power input and a second current sensor coupled to the controller, the un-switched power output configured to couple the load management system with a corresponding un-switched electrical load and the second current sensor configured to sense a current drawn by the un-switched power output.

7. The system of claim 6, wherein the controller is configured to measure with the second current sensor a current drawn by the un-switched electrical load and determine the switched current limit based on the measured current drawn by the un-switched electrical load.

8. The system of claim 7, wherein the controller is configured to measure the current drawn by the un-switched electrical load and determine the switched current limit before starting the iterative grouping process.

9. The system of claim 8, wherein the controller is further configured to determine the current drawn by the un-switched electrical load during the iterative grouping process; and if the determination of the current indicates an increase in the current drawn by the un-switched load, then interrupt the iterative grouping process, re-determine the switched current limit based on the increase in the current drawn by the un-switched load, and restart the iterative grouping process using the re-determined switched current limit.

10. The system of claim 1, wherein the controller is further configured to measure the current drawn by each of the plurality of electrical loads throughout the iterative grouping process, and if the measured currents indicate that an increase in the current drawn by the electrical loads within a load group is above the switched current limit, then interrupt and restart the iterative grouping process.

11. The system of claim 1, wherein the controller applying the electrical power to only one load group at a time comprises applying the electrical power to each load group for a predetermined period of time.

12. The system of claim 1, wherein the controller applying the electrical power to only one load group at a time comprises applying the electrical power to the load groups according to a power sequence.

13. The system of claim 12, wherein the power sequence is based on the number of power outputs and respective electrical loads within each load group or on a current draw of each load group.

14. The system of claim 13, wherein the power sequence is from a load group having the largest number of electrical loads to a load group having the least number of electrical loads.

15. The system of claim 13, wherein the power sequence is from a load group having the largest current draw to a load group having the smallest current draw.

16. A battery charging station, comprising:

an electrical power input configured to couple the charging station with a common power source;

a plurality of switched electrical power outputs configured to couple the charging station with a plurality of electrical loads comprising batteries to be charged;

a plurality of switches coupled between the power input and the switched power outputs;

a first current sensor coupled to the switched power outputs for sensing a current drawn by one or more of the switched power outputs;

an un-switched power output coupled to the electrical power input and configured to couple the charging station with an un-switched electrical load;

a second current sensor coupled to the un-switched power output for sensing a current drawn by the un-switched power output; and a controller coupled to the plurality of switches, the first current sensor, and the second current sensor, the controller configured to:
  determine a switched current limit based on the current drawn by the un-switched power output and a current limit of the common power source;
  carry out an iterative grouping process in which the controller is configured to
    measure with the first current sensor a current drawn by each of the electrical loads respectively coupled to the switched power outputs, each electrical load comprising a battery to be charged,
    group the plurality of switched power outputs and respective electrical loads into a plurality of load groups such that a sum of the measured currents of the electrical loads in each load group does not exceed the switched current limit, comprising
      forming a first load group with a maximum number of the switched power outputs and respective electrical loads,
      then forming a second load group with a maximum number of the switched power outputs and respective electrical loads not in the first load group, and
      then continuing to form additional load groups as long as any of the switched power outputs and respective electrical loads remain ungrouped, each successive additional load group having a maximum number of the currently ungrouped power outputs and respective electrical loads,
    operate the plurality of switches to apply electrical power from the common power source to each of the load groups to charge the batteries forming at least part of the electrical loads within each of the load groups, and to apply the electrical power to only one load group at a time while removing the electrical power from the other load groups, and
    restart the iterative grouping process after applying electrical power to each of the load groups; and
  continue the iterative grouping process at least until all of the plurality of switched power outputs and respective electrical loads are combined in one load group.

17. The charging station of claim 16, wherein the controller is configured to measure with the second current sensor the current drawn by the un-switched power output before starting the iterative grouping process.

18. The charging station of claim 17, wherein the controller is further configured to
  determine the current drawn by the un-switched power output during the iterative grouping process; and
  if the determination of the current indicates an increase in the current drawn by the un-switched power output, then interrupt the iterative grouping process,
    re-determine the switched current limit based on the increase in the current drawn by the un-switched load, and
    restart the iterative grouping process using the re-determined switched current limit.

19. The charging station of claim 16, wherein the controller is further configured to measure the current drawn by each of the switched power outputs throughout the iterative grouping process, and if the measured currents indicate that an increase in the current drawn by the switched power outputs within a load group is above the switched current limit, then interrupt and restart the iterative grouping process.

20. The charging station of claim 16, wherein the plurality of electrical loads to be charged comprise at least one of a notebook computer, a tablet computer, a cell phone, a smart phone, a personal digital assistant, a camera, a music player, and a global positioning satellite device.

21. The charging station of claim 16, wherein the charging station comprises a notebook charging cart.

22. The charging station of claim 16, wherein the charging station comprises a stationary battery charging station.

23. The charging station of claim 16, wherein the controller applying the electrical power to only one load group at a time comprises applying the electrical power to each load group for a predetermined period of time according to a power sequence.

24. The charging station of claim 23, wherein the power sequence is from a load group having the largest number of electrical loads to a load group having the least number of electrical loads or from a load group having the largest current draw to a load group having the smallest current draw.

25. A method for distributing electrical power to electrical loads for charging batteries, comprising:
  determining a switched current limit defining a limit for current drawn by a plurality of electrical loads coupled to a common power source through a load management system;
  carrying out an iterative grouping process, comprising:
    measuring a current drawn by each of the plurality of electrical loads, each electrical load comprising a battery to be charged;
    forming a first load group comprising a maximum number of the electrical loads without a sum of the measured currents of the electrical loads in the first load group exceeding the switched current limit;
    then forming a second load group comprising a maximum number of the electrical loads not in the first load group without a sum of the measured currents of the electrical loads in the second load group exceeding the switched current limit; and
    then continuing to form additional load groups as long as any of the electrical loads remain ungrouped, each successive additional load group having a maximum number of the currently ungrouped electrical loads without a sum of the measured currents of the electrical loads exceeding the switched current limit;
    charging the batteries within each of the first, second, and additional load groups by switching electrical power from the common power source to each of the load groups thereby applying the electrical power to only one load group at a time while removing the electrical power from the other load groups; and
    restarting the iterative grouping process after charging the batteries within each load group; and
  continuing the iterative grouping process at least until all of the plurality of electrical loads are combined in one load group.

26. The method of claim 25, wherein measuring the current drawn by each of the plurality of electrical loads comprises applying electrical power to one electrical load at a time.

27. The method of claim 25, further comprising applying electrical power through the load management system to an un-switched electrical load simultaneously with charging the batteries within each of the first, second, and additional load groups during the iterative grouping process.

28. The method of claim 27, further comprising measuring a current drawn by the un-switched electrical load, and determining the switched current limit based on the measured current drawn by the un-switched electrical load.

29. The method of claim 28, further comprising measuring the current drawn by the un-switched electrical load before starting the iterative grouping process.

30. The method of claim 28, further comprising measuring the current drawn by the un-switched electrical load during the iterative grouping process; and
   if the measuring of the current indicates an increase in the current drawn by the un-switched load, then
   interrupting the iterative grouping process;
   re-determining the switched current limit based on the increase in the current drawn by the un-switched load; and
   restarting the iterative grouping process using the re-determined switched current limit.

31. The method of claim 27, further comprising determining the switched current limit based on a current limit of the common power source.

32. The method of claim 25, further comprising measuring the current drawn by each of the plurality of electrical loads throughout the iterative grouping process, and if the measured currents indicate an increase in the current drawn by the electrical loads within a load group above the switched current limit, then interrupting and restarting the iterative grouping process.

33. The method of claim 25, wherein the load management system is part of a charging station for charging notebook computers.

34. The method of claim 33, wherein the charging station comprises a notebook charging cart.

35. The method of claim 25, wherein charging the batteries by applying the electrical power to only one load group at a time comprises applying the electrical power to each of the load groups for a predetermined period of time according to a power sequence based on at least one of a current draw of each load group and the number of electrical loads within each load group.

* * * * *